(12) United States Patent
Lee

(10) Patent No.: US 11,726,683 B2
(45) Date of Patent: Aug. 15, 2023

(54) STORAGE SYSTEM AND OPERATING METHOD FOR MOVING DATA BETWEEN STORAGE DEVICES THEREOF

(71) Applicant: SK hynix Inc., Gyeonggi-do (KR)

(72) Inventor: Kyung Soo Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 16 days.

(21) Appl. No.: 17/308,253

(22) Filed: May 5, 2021

(65) Prior Publication Data

US 2022/0137840 A1 May 5, 2022

(30) Foreign Application Priority Data

Nov. 2, 2020 (KR) ........................ 10-2020-0144641

(51) Int. Cl.
*G06F 3/06* (2006.01)

(52) U.S. Cl.
CPC .......... *G06F 3/0631* (2013.01); *G06F 3/0604* (2013.01); *G06F 3/0647* (2013.01); *G06F 3/0652* (2013.01); *G06F 3/0683* (2013.01)

(58) Field of Classification Search
CPC .... G06F 3/0631; G06F 3/0604; G06F 3/0647; G06F 3/0652; G06F 3/0683; G06F 3/0649; G06F 3/0685; G06F 3/061
See application file for complete search history.

(56) References Cited

U.S. PATENT DOCUMENTS

| | | | | |
|---|---|---|---|---|
| 9,792,172 B2 * | 10/2017 | Kanno | ................ | G06F 11/1008 |
| 9,965,199 B2 * | 5/2018 | Reddy | .................... | G11C 29/82 |
| 10,423,535 B2 * | 9/2019 | Chahal | ................ | G06F 12/0871 |
| 2018/0356992 A1 * | 12/2018 | Lamberts | ............. | G06F 3/0658 |
| 2020/0218668 A1 * | 7/2020 | Han | .................... | G06F 12/1458 |
| 2020/0233601 A1 * | 7/2020 | Du | ........................ | G06F 3/0647 |

FOREIGN PATENT DOCUMENTS

| | | |
|---|---|---|
| KR | 10-1481633 B1 | 1/2015 |
| KR | 10-2015-0096646 A | 8/2015 |

* cited by examiner

*Primary Examiner* — Charles Rones
*Assistant Examiner* — Alexander Vinnitsky
(74) *Attorney, Agent, or Firm* — IP & T Group LLP

(57) ABSTRACT

The present technology relates to an electronic device. More specifically, the present technology relates to a storage system. A storage system according to an embodiment includes a storage tier including a plurality of storage devices, a cache tier allocated for each of a plurality of storage devices and including a plurality of zone groups each including a hot data zone, a warm data zone, and a cold data zone, a system controller that moves data stored in a source storage device to a target storage device through the cache tier.

19 Claims, 14 Drawing Sheets

FIG. 4

| Data Region / Zone Number | First Data Region | Second Data Region | Third Data Region |
|---|---|---|---|
| 1 | Table 1_1 | Table 2_1 | Table 3_1 |
| 2 | Table 1_2 | Table 2_2 | Table 3_2 |
| ... | ... | ... | ... |
| n | Table 1_n | Table 2_n | Table 3_n |

| Table 1 | |
|---|---|
| DATA1 | Access Count 1 |
| DATA2 | Access Count 2 |
| DATA3 | Access Count 3 |
| DATA4 | Access Count 4 |
| DATA5 | Access Count 5 |
| | Average Access Count x |

| Table 2 | |
|---|---|
| DATA6 | Access Count 6 |
| DATA7 | Access Count 7 |
| DATA8 | Access Count 8 |
| DATA9 | Access Count 9 |
| DATA10 | Access Count 10 |
| | Average Access Count y |

| Table 3 | |
|---|---|
| DATA11 | Access Count 11 |
| DATA12 | Access Count 12 |
| DATA13 | Access Count 13 |
| DATA14 | Access Count 14 |
| DATA15 | Access Count 15 |
| | Average Access Count z |

STORAGE SYSTEM AND OPERATING METHOD FOR MOVING DATA BETWEEN STORAGE DEVICES THEREOF

CROSS-REFERENCE TO RELATED APPLICATION

The present application claims priority under 35 U.S.C. § 119(a) to Korean patent application number 10-2020-0144641, filed on Nov. 2, 2020, with the Korean Intellectual Property Office, and which is incorporated herein by reference in its entirety.

BACKGROUND

Field of Invention

One or more embodiments described herein relates to a storage system.

Description of Related Art

A storage device may include a memory controller and a memory device. The memory controller may control the storage of data in the memory device based on a signal from a host.

Volatile memory devices store data only while receiving power from a power source. When the power supply is cut off, the data stored in the volatile memory device may be lost. Examples of volatile memory devices include a static random access memory (SRAM) and a dynamic random access memory (DRAM).

Nonvolatile memory devices store data even when power from a power source is cut off. Examples of nonvolatile memory devices include a read only memory (ROM), a programmable ROM (PROM), an electrically programmable ROM (EPROM), an electrically erasable and programmable ROM (EEPROM), and a flash memory.

SUMMARY

In accordance with one or more embodiments, a storage system is provided that improves performance by classifying and temporarily storing cached data based on an attribute of the cached data.

A storage system according to an embodiment of the present disclosure may include a first storage device, a cache tier including a first zone group and a second zone group configured to temporarily store data, and a system controller configured to move data stored in the first storage device to the cache tier. Each of the first zone group and the second zone group may include a plurality of data zones configured to store data based on a number of times the data is accessed. The system controller may be configured to load the data stored in the first storage device in a source data zone included in the first zone group, and move the data loaded in the source data zone to a target data zone that is any one of the plurality of data zones included in the second zone group, based on a first access count and a second access count. The first access count corresponds to a number of access times of the source data zone and the second access count corresponds to a number of access times of a reference data zone included in the second zone group.

A storage system according to another embodiment of the present disclosure may include a storage tier including a plurality of storage devices, a cache tier including a plurality of zone groups configured to temporarily store data to be stored in the plurality of storage devices and to temporarily store data read from the plurality of storage devices, and a system controller configured to move data stored in a source storage device among the plurality of storage devices to a target storage device among the plurality of storage devices through the cache tier. The plurality of zone groups may be allocated for the plurality of storage devices, respectively, each of the plurality of zone groups may including N (N is a natural number greater than 1) data zones divided according to an average access count of stored data. The system controller may be configured to load the data stored in the source storage device, in a first data zone among the N data zones in a source zone group allocated to the source storage device, compare a first average access count of the data stored in the first data zone with a second average access count of data stored in a second data zone among the N data zones in a target zone group allocated to the target storage device, control the cache tier to move the data loaded in the first data zone to the second data zone when the first average access count is less than or equal to the second average access count, and control the storage tier to store data moved to the second data zone in the target storage device.

A storage system according to still another embodiment of the present disclosure may include a first storage device, a second storage device, a first cache region configures to temporarily store data to be stored in the first storage device and to temporarily storing data read from the first storage device, a second cache region configured to temporarily store data to be stored in the second storage device and to temporarily store data read from the second storage device, and a system controller configured to control moving data to be moved between the first storage device and the second storage device through the first cache region and the second cache region. Each of the first cache region and the second cache region may include a hot data zone, a warm data zone, and a cold data zone configured to store data in an order redetermined based on average access count. The average access count of the data stored in the first cache region may be greater than the average access count of the data stored in the second cache region. The system controller may be configured to temporarily store the data stored in the first storage device, in the hot data zone of the second cache region, and to store the data temporarily stored in the hot data zone of the second cache region, in the second storage device.

A An apparatus according to still another embodiment of the present disclosure may include a storage area to store instructions and a controller configured to execute the instructions to control a first storage device and a cache tier, the cash tier including a first zone group and a second zone group, each including a plurality of data zones. The controller to perform a load operation to load data stored in the first storage device in a source data zone that corresponds to one of the plurality of data zones in the first zone group, and a move operation to move the data loaded in the source data zone to a target data zone that corresponds to one of the plurality of data zones in the second zone group, the move operation to be performed based on a first access count and a second access count. The first access count corresponds to a number of access times of the source data zone and the second access count corresponds to a number of access times of a reference data zone that corresponds to one of the plurality of data zones in the second zone group.

According to the present technology, a storage system that improves performance by classifying and temporarily storing cached data according to an attribute of the cached data is provided.

BRIEF DESCRIPTION OF THE DRAWINGS

FIG. 4 illustrates an embodiment of an access count storage.

FIG. 5 illustrates examples of first to third tables including access count information.

DETAILED DESCRIPTION

Specific structural or functional descriptions of embodiments according to the concept which are disclosed in the present specification or application are illustrated only to describe the embodiments according to the concept of the present disclosure. The embodiments according to the concept of the present disclosure may be carried out in various forms and are not limited to the embodiments described in the present specification or application.

Figure 1:
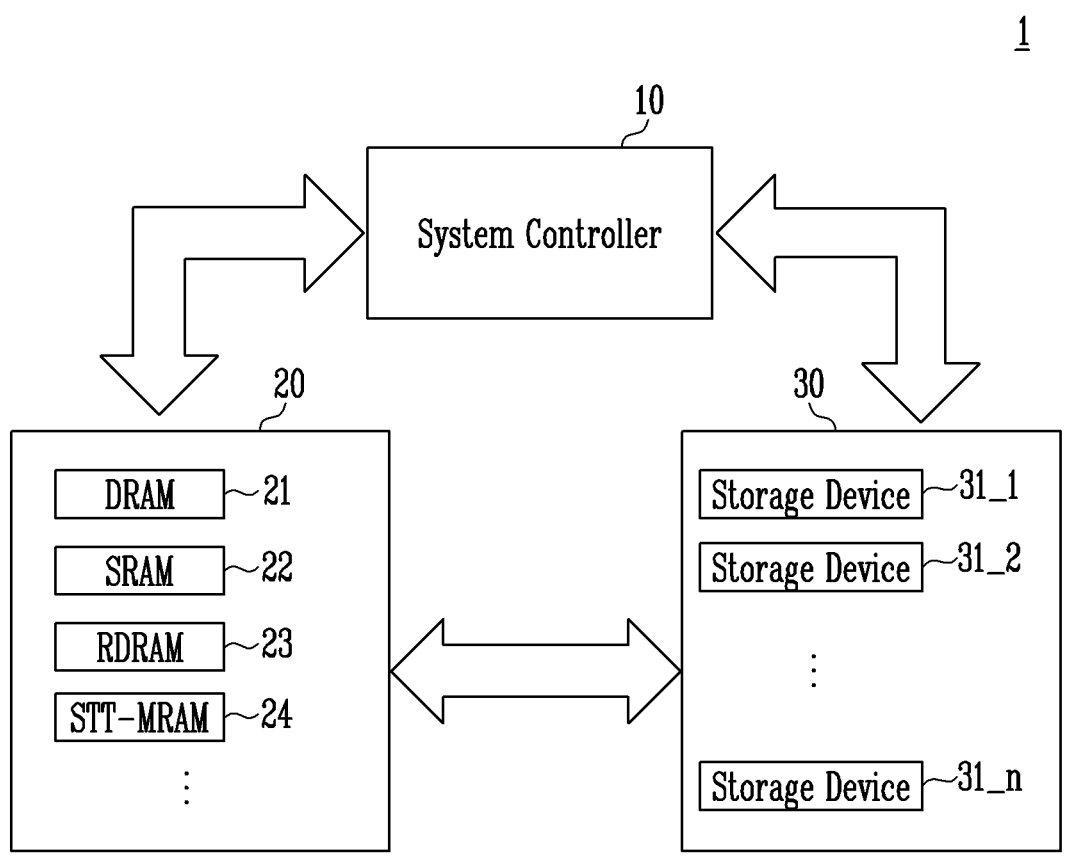
FIG. 1 illustrates an embodiment of a storage system.

FIG. 1 is a diagram illustrating an embodiment of a storage system 1, which may store or output data, for example, as directed by a user. The storage system 1 may be implemented as or be included in a personal computer (PC), a data center, a corporate data storage system, a data processing system including a direct attached storage (DAS), a data processing system including a storage area network (SAN), or a data processing system including a network attached storage (NAS).

Referring to FIG. 1, the storage system 1 may include a system controller 10, a cache tier 20, and a storage tier 30. The system controller 10 may store data in the storage tier 30 through the cache tier 20, or may obtain data stored in the storage tier 30 through the cache tier 20.

In an embodiment, the system controller 10 may temporarily store data from an external source in the cache tier 20. The system controller 10 may control the cache tier 20 to output data temporarily stored in the cache tier 20 to the storage tier 30. In addition, the system controller 10 may control the storage tier 30 to store data (which is temporarily stored in the cache tier 20) in the storage tier 30.

For example, the system controller 10 may provide the cache tier 20 with a flush command instructing to output (or flush) data temporarily stored in the cache tier 20 to the storage tier 30. The system controller 10 may provide the storage tier 30 with a write request requesting to store data in the storage tier 30 and a logical address for identifying the data.

In an embodiment, the system controller 10 may control the storage tier 30 to output data stored in the storage tier 30. For example, the system controller 10 may temporarily store the data output from the storage tier 30 in the cache tier 20. The system controller 10 may provide the data temporarily stored in the cache tier 20 to an external requester or destination.

The system controller 10 may, for example, provide the storage tier 30 with a read request requesting to read data stored in the storage tier 30 and a logical address for identifying the data stored in the storage tier 30. The system controller 10 may temporarily store the read data in the cache tier 20. In one embodiment, the system controller 10 may control the cache tier 20 to provide the data temporarily stored in the cache tier 20 to an external requester or destination.

The system controller 10 may communicate with the cache tier 20 or with the storage tier 30 to store the data in the storage tier 30 or to obtain the data stored in the storage tier 30. The system controller 10 may communicate with the cache tier 20 through an interface and may communicate with the storage tier 30 through an interface. The cache tier 20 may communicate with the storage tier 30 through an interface. The same interface or different interfaces may be used for these communications. Examples of the interface(s) include a serial advanced technology attachment (SATA) interface, a SATA express (SATA express) interface, a serial attached small computer system interface (SAS) interface, a peripheral component interconnect express (PCIe) interface, a nonvolatile memory express (NVMe) interface, an advanced host controller interface (AHCI), or a multimedia card interface. However, the interface(s) are not limited thereto. In an embodiment, the system controller 10 may be or be included in a host or another type of device.

The cache tier 20 may temporarily store data from the system controller 10 or may temporarily store data output from the storage tier 30. For example, the cache tier 20 may temporarily store data to be stored in the storage tier 30 or may temporarily store data output from the storage tier 30. The cache tier 20 may include one or more volatile memory devices, e.g., cache tier 20 may be a set of at least one volatile memory device.

Example of the one or more volatile memory devices may include a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a resistive random access memory (RRAM), a phase-change random access memory (PRAM), a magnetoresistive random access memory (MRAM), a ferroelectric random access memory, and a spin transfer torque magnetoresistive random access memory.

In an embodiment, the cache tier 20 may include a plurality of volatile memory devices 21, 22, 23, and 24. For example, the cache tier 20 may include a DRAM 21, an SRAM 22, an RDRAM 23, and a spin-transfer torque magnetoresistive RAM (STT-MRAM) 24. However, the cache tier 20 may include one or more different types of memory devices in other embodiments.

In an embodiment, the cache tier 20 may have an access speed faster than an access speed of the storage tier 30. For example, the speed at which the system controller 10 accesses the cache tier may be faster than the speed at which the system controller 10 accesses the storage tier 30.

The storage tier 30 may be a set of one or more storage devices and may store data or output previously stored data. In an embodiment, the storage tier 30 may store the data provided by the system controller 10 in response to a write request from the system controller 10, and may provide a response to the system controller 10 indicating that the storage is completed.

In an embodiment, the storage tier 30 may read data corresponding to a logical address provided by the system controller 10. This operation may be performed, for example, in response to a read request from the system controller 10. Storage tier 30 may output the read data in response to the read request.

In an embodiment, the storage tier 30 may include a plurality of storage devices 31_1, 31_2, and 31_n. The number of storage devices 31_1, 31_2, and 31_n stored in the storage tier 30 may be n (n is a natural number greater than 1). Each of the plurality of storage devices 31_1, 31_2, and 31_n may store data (e.g., provided from the cache tier 20) or may output stored data to the cache tier 20. Example embodiments of these operations are described with reference to FIGS. 8 to 11.

In an embodiment, the access speed of the storage tier 30 may be slower than the access speed of the cache tier 20. Also, in one embodiment, the frequency at which the system controller 10 accesses the storage device may be different for each of the plurality of storage devices 31_1, 31_2, and 31_n. The frequency at which the first storage device 31_1 is accessed among the plurality of storage devices 31_1, 31_2, and 31_n may be greater than the frequency at which storage devices 31_2 and 31_n other than the first storage device 31_1 are accessed among the plurality of storage devices 31_1, 31_2, and 31_n. The system controller 10 may access the storage device, for example, to store data in the storage device or read data from the storage device.

When the access frequency is different for each of the plurality of storage devices 31_1, 31_2, and 31_n, the useful life of the plurality of storage devices 31_1, 31_2, and 31_n may be different. For example, when the frequency at which the first storage device 31_1 is accessed is the largest among the storage devices 31_1, 31_2, and 31_n, the useful life of the first storage device 31_1 may be the shortest among the storage devices 31_1, 31_2, and 31_n. In this case, performance of the storage system 1 may be reduced due to an imbalance in the useful lives of the storage devices in the storage system.

In order to prevent a reduction in the performance of the storage system 1, data stored in one storage device having a relatively large access frequency may be moved to another storage device having a lesser or relatively low access frequency. In one embodiment, the frequency at which the storage devices are accessed may be uniformly maintained by moving data between or among the storage devices 31_1, 31_2, and 31_n. In addition, since the useful life of each of the plurality of storage devices 31_1, 31_2, and 31_n may be uniformly maintained, performance of the storage system 1 may be prevented from being excessively reduced.

In some cases, the capacities and/or access frequencies of the storage devices 31_1, 31_2, and 31_n may be different. For example, the speed at which the first storage device 31_1 is accessed may be the fastest among the storage devices 31_1, 31_2, and 31_n, and the storage capacity of the second storage device 31_2 may be the largest among the storage devices 31_1, 31_2, and 31_n.

In order to access data more quickly, data stored in a storage device having a relatively slow access speed may be moved to a storage device having a relatively fast access speed. By moving data between or among the storage devices 31_1, 31_2, and 31_n, performance of the storage system 1 may be improved by providing data to a user more quickly.

Figure 2:
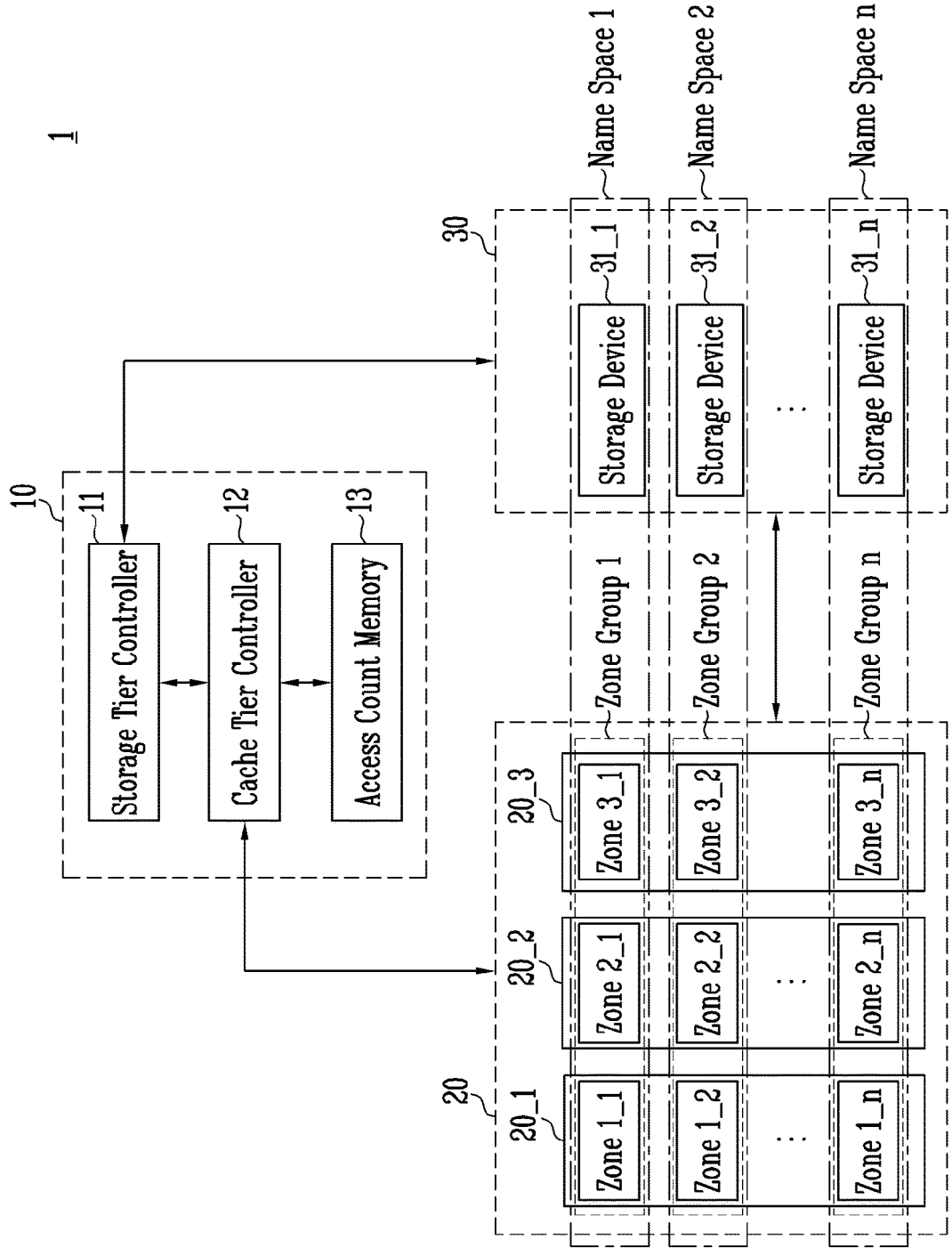
FIG. 2 illustrates an embodiment of a storage system.

FIG. 2 is a diagram illustrating an embodiment of a storage system. Referring to FIGS. 1 and 2, the system controller 10 may move data stored in a source storage device among the plurality of storage devices 31_1, 31_2, and 31_n to a target storage device among the plurality of storage devices 31_1, 31_2, and 31_n through the cache tier 20. This move operation may be performed, for example, when the data stored in the source storage device is copied to the target storage device and the data stored in the source storage device is invalidated.

In one embodiment, the source storage device may therefore be a storage device that stores data to be moved to the target storage device. For example, when the first storage device 31_1 is the source storage device, the target storage device may be one of the storage devices 31_2 or 31_n among the plurality of storage devices 31_1, 31_2, and 31_n.

The cache tier 20 may include a plurality of data regions. A data region may be, for example, a region in which data having the same attribute(s) are temporarily stored. The number of data regions may be N (N is a natural number greater than 1). In the example of FIG. 2, the number of data regions may be three. Hereinafter, for convenience of description, it is assumed that the data regions are first to third data regions 20_1, 20_2, and 20_3.

The first to third data regions 20_1, 20_2, and 20_3 may be classified, for example, according to one or more attributes of the data. An example of one data attribute is based on a classification of the data as hot data, warm data, or cold data. Whether data is to be classified as hot data, warm data, or cold data may be determined, for example, according to the number of times the data is accessed.

When the attribute of the data is classified as hot data, warm data, or cold data, the first to third data regions 20_1, 20_2, and 20_3 may be classified as a hot data region, a warm data region, and a cold data region. A hot data region may store hot data, a warm data region may store warm data, and a cold data region may store cold data. In one embodiment, the first data region 20_1 may be the hot data region, the second data region 20_2 may be the warm data region, and the third data region 20_3 may be the cold data region. The hot, warm, and cold data regions may correspond to a different combination of the first to third data regions 20_1, 20_2, and 20_3 in another embodiment.

In an embodiment, at least one data region may correspond to one of the plurality of volatile memory devices 21, 22, 23, and 24 of FIG. 1. In this case, data regions may have access speeds (for example, write speeds) that correspond to respective ones of the volatile memory devices 21, 22, 23, and 24. By way of example, the access speed of RDRAM 23 may be higher than the access speed of the DRAM 21 among the plurality of volatile memory devices 21, 22, 23, and 24. The access speed of the SRAM 22 may be higher than the access speed of the RDRAM 23. In this case, the first data region 20_1 may correspond to the SRAM 22, the second data region 20_2 may correspond to the RDRAM 23, and the third data region 20_3 may correspond to the DRAM 21. However, the present disclosure is not limited thereto. In one embodiment, the first data region 20_1 may correspond to a volatile memory device having the highest access speed and the third data region 20_3 may correspond to a volatile memory device having the lowest access speed.

In another example, the first data region 20_1 may correspond to the SRAM 22 and the second data region 20_2 and the third data region 20_3 may correspond to the RDRAM 23. However, the present disclosure is not limited thereto.

One data region may include a plurality of data zones. For example, the first data region 20_1 may include (1_1)-th to (1_*n*)-th data zones Zone 1_1, Zone 1_2, and Zone 1_*n*. The second data region 20_2 may include (2_1)-th to (2_*n*)-th data zones Zone 2_1, Zone 2_2, and Zone 2_*n*. The third data region 20_3 may include (3_1)-th to (3_*n*)-th data zones Zone 3_1, Zone 3_2, and Zone 3_*n*.

In one embodiment, the number of data zones in one data region may correspond to the number of storage devices 31_1, 31_2, and 31_*n* in the storage tier 30. For example, when the number of storage devices 31_1, 31_2, and 31_*n* is n, the number of (1_1)-th to (1_*n*)-th data zones Zone 1_1, Zone 1_2 in the first data region 20_1 may be n. In addition, the number of (2_1)-th to (2_*n*)-th data zones Zone 2_1, Zone 2_2, and Zone 2_*n* in the second data region 20_2 may also be n, and the number of (3_1)-th to (3_*n*)-th data zones Zone 3_1, Zone 3_2, and Zone 3_*n* in the third data region 20_3 may also be n.

One data zone may be a storage space having a preset storage capacity. The storage capacities of the data zones in one data region may be the same or different. For example, first data may be stored in one of the data zones in one data region, and the first data and second data may be stored in another data zone in the one data region. However, the present disclosure is not limited thereto. In one embodiment, data zone and zone may have the same meaning.

In an embodiment, cache tier 20 may include a plurality of zone groups Zone Group 1, Zone Group 2, and Zone Group n. The plurality of zone groups Zone Group 1, Zone Group 2, Zone Group n may temporarily store data to be stored in the storage devices 31_1, 31_2, and 31_*n* or may temporarily store data read from the storage devices 31_1, 31_2, and 31_*n*.

The zone groups Zone Group 1, Zone Group 2, and Zone Group n may be allocated to respective ones of the storage devices 31_1, 31_2, and 31_*n*. For example, the first zone group Zone Group 1 may be allocated to the first storage device 31_1. The second zone group Zone Group 2 may be allocated to the second storage device 31_2. The n-th zone group Zone Group n may be allocated to the n-th storage device 31_*n*.

In an embodiment, data stored in the first storage device 31_1 may be temporarily stored in the first zone group Zone Group 1. In one embodiment, the data temporarily stored in the first zone group Zone Group 1 may be stored in the first storage device 31_1.

In an embodiment, data stored in the second storage device 31_2 may be temporarily stored in the second zone group Zone Group 2. In one embodiment, the data temporarily stored in the second zone group Zone Group 2 may be stored in the second storage device 31_2.

In an embodiment, data stored in the third storage device 31_3 may be temporarily stored in the third zone group Zone Group 3. In one embodiment, the data temporarily stored in the third zone group Zone Group 3 may be stored in the third storage device 31_3.

Each of the plurality of zone groups Zone Group 1, Zone Group 2, and Zone Group n may include N (N is a natural number greater than 1) data zones. For example, one zone group may include one data zone in the first data region 20_1, one data zone in the second data region 20_2, and one data zone in the third data region 20_3. Thus, one zone group may include three data zones, but may include a different number of zones in another embodiment. Here, the N data zones may be classified, for example, according to an average access count of the data stored in each data zone. Average access count may be, for example, an average value of access counts of the data stored in one data zone. An access count may be, for example, a value indicating the number of times data is accessed. In one embodiment, an access count may be a value indicating the number of times each data zone is accessed. For example, when data to be temporarily stored in the cache tier 20 is loaded in the (1_1)-th data zone Zone 1_1, an access count indicating the number of times the (1_1)-th data zone Zone 1_1 is accessed may increase.

In an embodiment, each of the (1_1)-th to (1_*n*)-th data zones Zone 1_1, Zone 1_2, and Zone 1_*n* in the first data region 20_1 (which is the hot data region) may be a hot data zone. Each of the (2_1)-th to (2_*n*)-th data zones Zone 2_1, Zone 2_2, and Zone 2_*n* in the second data region 20_2 (which is the warm data region) may be a warm data zone. Each of the (3_1)-th to (3_*n*)-th data zones Zone 3_1, Zone 3_2, and Zone 3_*n* in the third data region 20_3 (which is the cold data region) may be a cold data zone.

In an embodiment, when the attribute of data stored in one storage device is hot data, the data stored in one storage device may be temporarily stored in the hot data zone. When the attribute of data stored in one storage device is warm data, the data stored in one storage device may be temporarily stored in the warm data zone. When the attribute of data stored in one storage device is cold data, the data stored in one storage device may be temporarily stored in the cold data zone.

In an embodiment, the hot data zone, warm data zone, and cold data zone may be zones in which data is temporarily stored according to the number of times data stored in one storage device is accessed. For example, data may be stored in each of the hot data zone, the warm data zone, and the cold data zone in a predetermined order, e.g., a descending order of average access count. For example, according to this order, the average access count of the data stored in the hot data zone may be the largest and the average access count of the data stored in the cold data zone may be the smallest. In another embodiment, a different predetermined order may be used.

In an embodiment, the hot data zone, the warm data zone, and the cold data zone may be classified according to the number of times the data zone is accessed.

Since the data to be stored in the storage device is temporarily stored in the zone group or the data read from the storage device is temporarily stored in the zone group, the zone group may be a cache region in at least one embodiment. For example, the first zone group Zone Group 1 may be a first cache region and the second zone group Zone Group 2 may be a second cache region.

In an embodiment, the system controller 10 may manage one storage device and one zone group allocated to one storage device as one name space. For example, the system controller 10 may manage the first storage device 31_1 and the first zone group Zone Group 1 as a first name space Name Space 1, the second storage device 31_2 and the second zone group Zone Group 2 as a second name space Name Space 2, and the n-th storage device 31_*n* and the n-th zone group Zone Group n as an n-th name space Name Space n.

The system controller 10 may load the data stored in the source storage device in a source data zone among the N data zones in a source zone group. Here, the source zone group may be a zone group allocated to the source storage device. For example, when the source storage device is the first storage device 31_1, the source zone group may be the first zone group Zone Group 1. The source data zone may be one of the N data zones in the source zone group. For example, when the source zone group is the first zone group Zone Group 1, the source data zone may be one of the (1_1)-th, (2_1)-th, and (3_1)-th data zones Zone 1_1, Zone 2_1, and Zone 3_1 in the first zone group Zone Group 1.

In an embodiment, the system controller 10 may load the data, which is stored in the source storage device, in the warm data zone of the source zone group. For example, when the source storage device is the first storage device 31_1, the source group zone may be the first zone group Zone Group 1, and the warm data zone of the first zone group Zone Group 1 may be the (2_1)-th data zone Zone 2_1 in the second data region 20_2, among the (1_1)-th, (2_1)-th, and (3_1)-th data zones Zone 1_1, Zone 2_1, and Zone 3_1 in the first zone group Zone Group 1. At this time, the warm data zone of the first zone group Zone Group 1 may be the source data zone.

In an embodiment, the system controller 10 may load the data, which is stored in the source storage device, in the hot data zone of the source zone group. For example, when the source storage device is the first storage device 31_1, the source zone group may be the first zone group Zone Group 1, and the hot data zone of the first zone group Zone Group 1 may be the (1_1)-th data zone Zone 1_1 in the first data region 20_1, among the (1_1)-th, (2_1)-th, and (3_1)-th data zones Zone 1_1, Zone 2_1, and Zone 3_1. At this time, the hot data zone of the first zone group Zone Group 1 may be the source data zone.

In an embodiment, the system controller 10 may load the data, which is stored in the source storage device, in the cold data zone of the source zone group. For example, when the source storage device is the first storage device 31_1, the source zone group may be the first zone group Zone Group 1, and the cold data zone of the first zone group Zone Group 1 may be the (3_1)-th data zone Zone 3_1 in the third data region 20_3, among the (1_1)-th, (2_1)-th, and (3_1)-th data zones Zone 1_1, Zone 2_1, and Zone 3_1. At this time, the cold data zone of the first zone group Zone Group 1 may be the source data zone.

Hereinafter, for convenience of description and as a non-limiting example, embodiments are described under an assumption that the source data zone is the warm data zone.

When the data stored in the source storage device is loaded in the warm data zone of the source zone group, the system controller 10 may obtain a first access count (corresponding to the number of times the warm data zone of the source zone group is accessed) and a second count (corresponding to the number of times a reference data zone of a target zone group is accessed). Embodiments of a method of obtaining the first access count and the second access count are described with reference to FIGS. 4 and 5.

The target zone group may be a zone group allocated to the target storage device. For example, when the target storage device is the second storage device 31_2, the target zone group may be the second zone group Zone Group 2. In addition, the reference data zone of the target zone group may be one of the (1_2)-th, (2_2)-th, and (3_2)-th data zones Zone 1_2, Zone 2_2, and Zone 3_2 in the second zone group Zone Group 2. For example, the reference data zone of the target zone group may be the (2_2)-th data zone Zone 2_2 (e.g., the warm data zone) in the second data region 20_2.

Hereinafter, for convenience of description and as a non-limiting example, embodiments are described in which the reference data zone of the target zone group is the warm data zone.

When the first access count and the second access count are obtained, the system controller 10 may control the cache tier 20 to move the data loaded in the warm data zone of the source zone group to the target data zone. This move operation may be performed based on the first access count and the second access count. Here, the target data zone may be one of the hot data zone, the warm data zone, and the cold data zone in the target zone group.

The system controller 10 may control the storage tier 30 to store the data moved to the target data zone in the target storage device.

In an embodiment, the system controller 10 may include a storage tier controller 11, a cache tier controller 12, and an access count storage (access count memory) 13. The storage tier controller 11 may control the source storage device to perform a read operation of reading the data stored in the source storage device. The storage tier controller 11 may control the target storage device to perform a write operation of storing the data moved to the target data zone in the target storage device.

The cache tier controller 12 may obtain the first access count and the second access count based on access count information provided from the access count storage 13. The cache tier controller 12 may compare the first access count and the second access count. In one embodiment, the cache tier controller 12 may compare whether the first access count is greater than the second access count. In one embodiment, the cache tier controller 12 may compare whether the first access count is less than or equal to the second access count. The cache tier controller 12 may control the cache tier 20 to move the data loaded in the warm data zone of the source zone group to the target data zone according to a result of the comparison.

The access count storage 13 may store the access count information. In one embodiment, the access count information may indicate the number of times the data stored in each of the plurality of data zones Zone 1_1, Zone 2_1, Zone 3_1, Zone 1_2, Zone 2_2, Zone 3_2, Zone 1_n, Zone 2_n, and Zone 3_n is accessed, that is, the access count. Embodiment will be described with reference to FIGS. 4 and 5.

The plurality of storage devices 31_1, 31_2, and 31_n may have one or more different characteristics or attributes, e.g., operation policy, useful life, use, and/or one or more other characteristics. In this case, the cache tier controller 12 may preset weights corresponding to each of the plurality of storage devices 31_1, 31_2, and 31_n. When the cache tier controller 12 compares the first access count and the second access count, the cache tier controller 12 may reflect (or assign) a weight corresponding to a characteristic of the target storage device selected from among the storage devices 31_1, 31_2, and 31_n on the second access count. For example, the cache tier controller 12 may reflect (or assign) a weight corresponding to the target storage device (among the weights corresponding to each of the plurality of storage devices 31_1, 31_2, and 31_n) on the second access count. In addition, the cache tier controller 12 may control the cache tier 20 to move the data loaded in the warm data zone of the source zone group to the target data zone according to a result of comparing the first access count and the second access count, which reflects or corresponds to the weight of the target storage device.

In one embodiment, the system controller 10 may load the data, which is stored in the source storage device, in the first data zone among the N data zones in the source zone group. When the data stored in the source storage device is loaded in the first data zone, the system controller 10 may compare a first average access count of the data stored in the first data zone and a second average access count of the data stored in the second data zone, among the N data zones in the target zone group. The system controller 10 may control the cache tier 20 to move the data loaded in the first data zone to the second data zone according to whether the first average access count is less than or equal to the second average access count. The system controller 10 may control the storage tier 30 to store the data moved to the second data zone in the target storage device.

In one embodiment, the average access count of the data stored in the first cache region (for example, the first zone group Zone Group 1) may be greater than the average access count of the data stored in the second cache region (for example, the second zone group Zone Group 2). In this case, the system controller 10 may control an operation of moving data, which is to be moved between one storage device (for example, the first storage device 31_1) and another storage device (for example, the second storage device 31_2) through the first cache region and the second cache region. For example, the system controller 10 may temporarily store the data (which is stored in the first storage device 31_1) in the hot data zone (for example, the (1_2)-th data zone Zone 1_2) of the second cache region, and then may store the data (which is temporarily stored in the hot data zone of the second cache region) in the second storage device 31_2.

Figure 3:
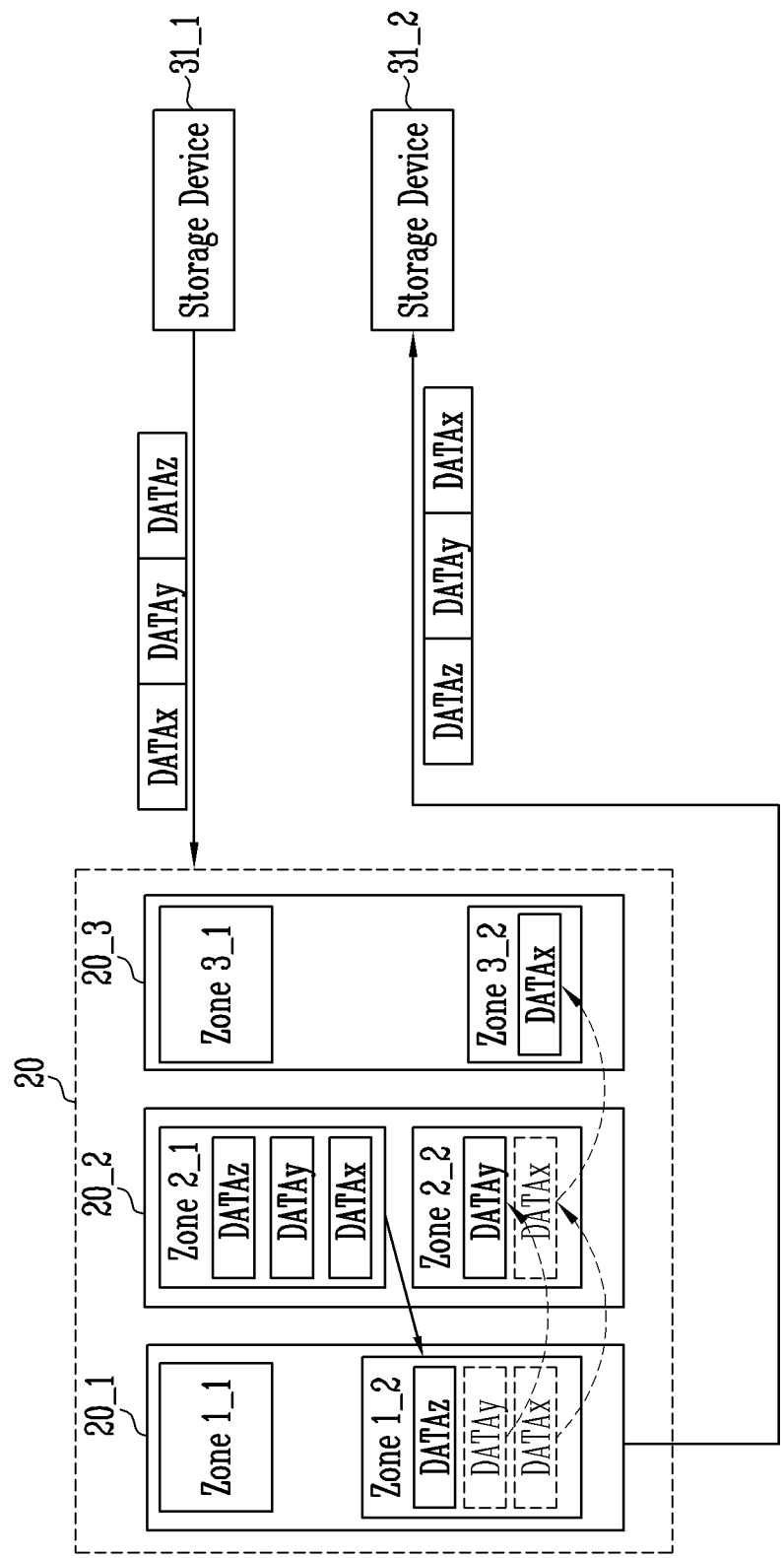
FIG. 3 illustrates an embodiment in which data is moved in a cache tier.

FIG. 3 is a diagram illustrating an embodiment in which data is moved in a cache tier. In describing the embodiment of FIG. 3, it is assumed that the source storage device is the first storage device 31_1, the source zone group is the first zone group Zone Group 1, the target storage device is the second storage device 31_2, and the target zone group is the second zone group Zone Group 2. In addition, it is assumed that the first data region 20_1 is the hot data region, the second data region 20_2 is the warm data region, and the third data region 20_3 is the cold data region. In addition, it is assumed that each of the (1_1)-th and (1_2)-th data zones Zone 1_1 and Zone 1_2 in the first data region 20_1 is the hot data zone, each of the (2_1)-th and (2_2)-th data zones Zone 2_1 and Zone 2_2 in the second data region 20_2 is the warm data zone, and each of the (3_1)-th and (3_2)-th data zones Zone 3_1 and Zone 3_2 in the third data region 20_3 is the cold data zone.

In an embodiment, the system controller 10 may control the cache tier 20 and the storage tier 30 to move the data stored in the first storage device 31_1 to the second storage device 31_2 according to a request of the user.

Referring to FIGS. 2 and 3, for example, the system controller 10 may temporarily store the data (which is stored in the first storage device 31_1) in the hot data zone of the second cache region, and then may store the data (which is temporarily stored in the hot data zone of the second cache region) in the second storage device 31_2.

For example, the storage tier controller 11 may control the first storage device 31_1 to perform a read operation of reading x-th data DATAx (x is a natural number) stored in the first storage device 31_1. The first storage device 31_1 may perform the read operation and output the x-th data DATAx. The storage tier controller 11 may load the x-th data DATAx in the (2_1)-th data zone Zone 2_1 in the first zone group Zone Group 1. In this case, since the x-th data DATAx is recently accessed data, an attribute of the x-th data DATAx may be treated as the hot data. The cache tier controller 12 may control the cache tier 20 to store the x-th data DATAx, which is stored in the (2_1)-th data zone Zone 2_1, in the (1_2)-th data zone Zone 1_2 in the second zone group Zone Group 2. The storage tier controller 11 may control the second storage device 31_2 to perform a write operation of storing the x-th data DATAx, which is stored in the (1_2)-th data zone Zone 1_2, in the second storage device 31_2.

After the x-th data DATAx is moved from the first storage device 31_1 to the second storage device 31_2, the system controller 10 may control the storage tier 30 to move y-th data DATAy (y is a natural number), which is stored in the first storage device 31_1, to the second storage device 31_2. For example, the y-th data DATAy, which is stored in the first storage device 31_1, may be loaded in the (2_1)-th data zone Zone 2_1 in the first zone group Zone Group 1. Since the y-th data DATAy is recently accessed data, an attribute of the y-th data DATAy may be the hot data. The y-th data DATAy stored in the (2_1)-th data zone Zone 2_1 may be moved to the (1_2)-th data zone Zone 1_2 in the second zone group Zone Group 2.

At this time, with a size of the x-th data DATAx and the y-th data DATAy stored in the (1_2)-th data zone 1_2 Zone 1_2, a storage capacity of the (1_2)-th data zone Zone 1_2 in the second zone group Zone Group 2 may be filled. In this case, the cache tier controller 12 may control the cache tier 20 to move the x-th data DATAx corresponding to least recently used (LRU) among the x-th data DATAx and the y-th data DATAy stored in the (1_2)-th data zone Zone 1_2 to the (2_2)-th data zone Zone 2_2 in the second zone group Zone Group 2.

Meanwhile, the y-th data DATAy (which is stored in the (1_2)-th data zone Zone 1_2) may be stored in the second storage device 31_2.

After the y-th data DATAy is moved from the first storage device 31_1 to the second storage device 31_2, z-th data DATAz (z is a natural number) stored in the first storage device 31_1 may also be moved to the second storage device 31_2.

At this time, the z-th data DATAz stored in the (2_1)-th data zone Zone 2_1 may be moved to the (1_2)-th data zone Zone 1_2 in the second zone group Zone Group 2, and with a size of the y-th data DATAy and the z-th data DATAz stored in the (1_2)-th data zone Zone 1_2, a storage capacity of the (1_2)-th data zone Zone 1_2 may be filled. In this case, the y-th data DATAy corresponding to the LRU among the y-th data DATAy and the z-th data DATAz may be moved to the (2_2)-th data zone Zone 2_2.

As the y-th data DATAy is moved to the (2_2)-th data zone Zone 2_2, with the size of the x-th data DATAx and the y-th data DATAy stored in the (2_2)-th data zone Zone 2_2, a storage capacity of the (2_2)-th data zone Zone 2_2 may be filled. In this case, the cache tier controller 12 may control the cache tier 20 to move the x-th data DATAx corresponding to the LRU (among the x-th data DATAx and the y-th data DATAy stored in the (2_2)-th data zone Zone 2_2) to the (3_2)-th data zone Zone 3_2 in the second zone group Zone Group 2.

Meanwhile, the z-th data DATAz stored in the (1_2)-th data zone Zone 1_2 may be stored in second storage device 31_2.

After the z-th data DATAz is moved from the first storage device 31_1 to the second storage device 31_2, another data stored in the first storage device 31_1 may be moved to the second storage device 31_2. When a size of the z-th data DATAz and another data stored in the (1_2)-th data zone Zone 1_2 meets the storage capacity of the (1_2)-th data zone Zone 1_2, the z-th data DATAz may be moved to the (2_2)-th data zone Zone 2_2. When the size of the y-th data DATAy and z-th data DATAz stored in the (2_2)-th data zone Zone 2_2 meets the storage capacity of (2_2)-th data zone Zone 2_2, the y-th data DATAy may be moved to the (3_2)-th data zone Zone 3_2.

As the y-th data DATAy is moved to the (3_2)-th data zone Zone 3_2, with the size of the x-th data DATAx and the y-th data DATAy stored in the (3_2)-th data zone Zone 3_2, a storage capacity of the (3_2)-th data zone Zone 3_2 may be filled. In this case, the cache tier controller 12 may control the cache tier 20 to delete the x-th data DATAx corresponding to the LRU among the x-th data DATAx and y-th data DATAy stored in the (3_2)-th data zone Zone 3_2.

In the embodiment described above with reference to FIG. 3, after the x-th data DATAx is stored in the second storage device 31_2, the y-th data DATAy is stored in the second storage device 31_2. After the y-th data DATAy is stored in the second storage device 31_2, the z-th data DATAz is stored in the second storage device 31_2. However, the present disclosure is not limited thereto. For example, the above-described embodiment may be applied even when the x-th data DATAx, the y-th data DATAy, and the z-th data DATAz are output from the first storage device 31_1 at one time.

In one embodiment, for an operation in which data stored in the cache tier 20 is stored in the target storage device, only the data stored in the (3_2)-th data zone Zone 3_2 may be stored in the target storage device, after the data stored in the first storage device 31_1 is finally moved to the (3_2)-th data zone Zone 3_2 through the (2_1)-th data zone Zone 2_1, the (1_2)th data zone Zone 1_2, and the (2_2)-th data zone Zone 2_2 of the cache tier 20. For example, referring to FIG. 3, only the x-th data DATAx (which is temporarily stored in the (3_2)-th data zone Zone 3_2) may be stored in the second storage device 31_2, among the x-th data DATAx, the y-th data DATAy, and the z-th data DATAz.

In some cases, an operation policy may be different for each of the plurality of storage devices 31_1, 31_2, and 31_n. When this occurs, the attribute of the data may be treated differently according to which storage device the data is stored in, among the plurality of storage devices 31_1, 31_2, and 31_n. For example, even though the attribute of the data stored in the first storage device 31_1 is treated as hot data, the data stored in the first storage device 31_1 may be treated as warm data or cold data in the second storage device 31_2. When the data stored in the first storage device 31_1 is always moved to the (1_2)-th data zone Zone 1_2 corresponding to the hot data zone, the data may be treated as hot data, even though the data is required to be treated as warm data or cold data in the second storage device 31_2. Since this does not comply with the operation policy of the second storage device 31_2, performance of the storage system 1 may be reduced. Therefore, the data stored in the source data device is to be properly classified and stored, based on the access count of the data stored in the source storage device and the access count of the data stored in the target storage device.

FIG. 4 is a diagram illustrating an access count storage according to an embodiment, and FIG. 5 is a diagram illustrating first to third tables including access count information according to an embodiment.

Referring to FIGS. 2 and 4, the access count storage 13 may include access count information indicating the number of times each of the data zones Zone 1_1, Zone 2_1, Zone 3_1, Zone 1_2, Zone 2_2, Zone 3_2, Zone 1_n, Zone 2_n, and Zone 3_n is accessed. For example, the access count storage 13 may include access count information indicating the access count of the data in each of data zones Zone 1_1, Zone 2_1, Zone 3_1, Zone 1_2, Zone 2_2, Zone 3_2, Zone 1_n, Zone 2_n, and Zone 3_n. The access count information may be arranged, for example, in a table and may be stored in the access count storage 13.

Referring to FIGS. 2 and 4, the access count storage 13 may store (1_1)-th to (1_n)-th tables Table 1_1, Table 1_2, and Table 1_n including the access count information of the data stored in each of the (1_1)-th to (1_n)-th data zones Zone 1_1, Zone 1_2, and Zone 1_n in the first data region 20_1. Here, the (1_1)-th table Table 1_1 may include the access count information of the data stored in the (1_1)-th data zone Zone 1_1 in the first data region 20_1. The (1_2)-th table Table 1_2 may include the access count information of the data stored in the (1_2)-th data zone Zone 1_2 in the first data region 20_1. The (1_n)-th table Table 1_n may include the access count information of the data stored in the (1_n)-th data zone Zone 1_n in the first data region 20_1.

Referring to FIGS. 2 and 4, for example, the access count storage 13 may store (2_1)-th to (2_n)-th tables Table 2_1, Table 2_2, and Table 2_n including the access count information of the data stored in each of the (2_1)-th to (2_n)-th data zones Zone 2_1, Zone 2_2, and Zone 2_n in the second data region 20_2. Here, the (2_1)-th table Table 2_1 may include the access count information of the data stored in the (2_1)-th data zone Zone 2_1 in the second data region 20_2. The (2_2)-th table Table 2_2 may include the access count information of the data stored in the (2_2)-th data zone Zone 2_2 in the second data region 20_2. The (2_n)-th table Table 2_n may include the access count information of the data stored in the (2_n)-th data zone Zone 2_n in the second data region 20_2.

Referring to FIGS. 2 and 4, for example, the access count storage 13 may store (3_1)-th to (3_n)-th tables Table 3_1, Table 3_2, and Table 3_n including the access count information of the data stored in each of the (3_1)-th to (3_n)-th data zones Zone 3_1, Zone 3_2, and Zone 3_n in the third data region 20_3. Here, the (3_1)-th table Table 3_1 may include the access count information of the data stored in the (3_1)-th data zone Zone 3_1 in the third data region 20_3. The (3_2)-th table Table 3_2 may include the access count information of the data stored in the (3_2)-th data zone Zone 3_2 in the third data region 20_3. The (3_n)-th table Table 3_n may include the access count information of the data stored in the (3_n)-th data zone Zone 3_n in the third data region 20_3.

In an embodiment, the access count information may include information indicating the access counts of the data stored in a hot data zone (for example, any one of Zone 1_1, Zone 1_2, and Zone 1_n) in each of the plurality of zone groups Zone Group 1, Zone Group 2, and Zone Group n.

In an embodiment, the access count information may include information indicating the access counts of the data stored in a warm data zone (for example, any one of Zone 2_1, Zone 2_2, and Zone 2_n) in each of the plurality of zone groups Zone Group 1, Zone Group 2, and Zone Group n.

In an embodiment, the access count information may include information indicating the access counts of the data stored in a cold data zone (for example, any one of Zone 3_1, Zone 3_2, and Zone 3_n) in each of the plurality of zone groups Zone Group 1, Zone Group 2, and Zone Group n.

Referring to FIG. 5, a first table Table 1 may be one of the (1_1)-th to (1_n)-th tables Table 1_1, Table 1_2, and Table 1_n shown in FIG. 4. A first table Table 2 may be one of the (2_1)-th to (2_n)-th tables Table 2_1, Table 2_2, and Table 2_n shown in FIG. 4. A first table Table 3 may be one of the (3_1)-th to (3_n)-th tables Table 3_1, Table 3_2, and Table 3_n in FIG. 4.

The first table Table 1 may include information indicating first to fifth access counts Access Count 1 to Access Count 5 of first to fifth data DATA1 to DATA5. The second table Table 2 may include information indicating sixth to tenth access counts Access Count 6 to Access Count 10 of sixth to tenth data DATA6 to DATA10. The third table Table 3 may include information indicating eleventh to fifteenth access counts Access Count 11 to Access Count 15 of eleventh to fifteenth data DATA11 to DATA15.

Referring again to FIG. 4, in an embodiment, the cache tier controller 12 may calculate the average access count of the data by referring to the plurality of tables Table 1_1, Table 2_1, Table 3_1, Table 1_2, Table 2_2, Table 3_2, Table 1_n, Table 2_n, and Table 3_n. For example, referring to FIG. 5, the cache tier controller 12 may calculate an x-th average access count Average Access Count x, which may be an average value of the first to fifth access counts Access Count 1 to Access Count 5 in the first table Table 1. Additionally, for example, the cache tier controller 12 may calculate a y-th average access count Average Access Count y, which may be an average value of the sixth to tenth access counts Access Count 6 to Access Count 10 in the second table Table 2. Additionally, for example, the cache tier controller 12 may calculate a z-th average access count Average Access Count z, which may be an average value of the eleventh to fifteenth access counts Access Count 11 to Access Count 15 in the third table Table 3.

In an embodiment, the cache tier controller 12 may calculate an average value of the access counts of the data stored in a warm data zone of the source zone group as a first access count, and calculate an average value of the access counts of the data stored in a warm data zone of the target zone group as a second access count.

For example, referring to FIGS. 2, 4, and 5, assuming that the source zone group is the first zone group Zone Group 1 and the target zone group is the second zone group Zone Group 2, the cache tier controller 12 may calculate an average value of the access counts in the (2_1)-th table Table 2_1 as the first access count. The cache tier controller 12 may calculate an average value of the access counts included in the (2_2)-th table Table 2_2 as the second access count. Here, the average value of the access counts may be calculated, for example, in the manner described with reference to FIG. 5.

In one embodiment, the average access count may be included in each of the plurality of tables Table 1_1, Table 2_1, Table 3_1, Table 1_2, Table 2_2, Table 3_2, Table 1_n, Table 2_n, and Table 3_n stored in the access count storage 13. In this case, the cache tier controller 12 may obtain the average access count from the access count storage 13 without performing a separate operation.

In an embodiment, with respect to any one of the plurality of zone groups Zone Group 1, Zone Group 2, and Zone Group n, the average value of the access counts of the data stored in a hot data zone may be greater than the average value of the access counts of the data stored in a warm data zone. In addition, the average value of the access counts of the data stored in a warm data zone may be greater than the average value of the access counts of the data stored in a cold data zone.

For example, referring to FIGS. 4 and 5, it is assumed that one of the plurality of zone groups Zone Group 1, Zone Group 2, and Zone Group n is the first zone group Zone Group 1, the first table Table 1 is the (1_1)-th table Table 1_1, the second table Table 2 is the (2_1)-th table Table 2_1, and the third table Table 3 is the (3_1)-th table Table 3_1. The x-th average access count Average Access Count x may be greater than the y-th average access count Average Access Count y. In addition, the y-th average access count Average Access Count y may be greater than the z-th average access count Average Access Count z.

In one embodiment, an average access count of the data stored in the first cache region may be greater than an average access count of the data stored in the second cache region. For example, the average access count (which is the average value of the access counts of the (1_1)-th, (2_1)-th, and (3_1)-th tables Table 1_1, Table 2_1, and Table 3_1 stored in the first zone group Zone Group 1) may be greater than the average access count, which is the average value of the access counts of the (1_2)-th, (2_2)-th, and (3_2)-th tables Table 1_2, Table 2_2, and Table 3_2 stored in the second zone group Zone Group 2.

In an embodiment, the cache tier controller 12 may reset or initialize the access count information stored in the access count storage 13, based on preset reference access count information and the access count information stored in the access count storage 13.

Figure 6:
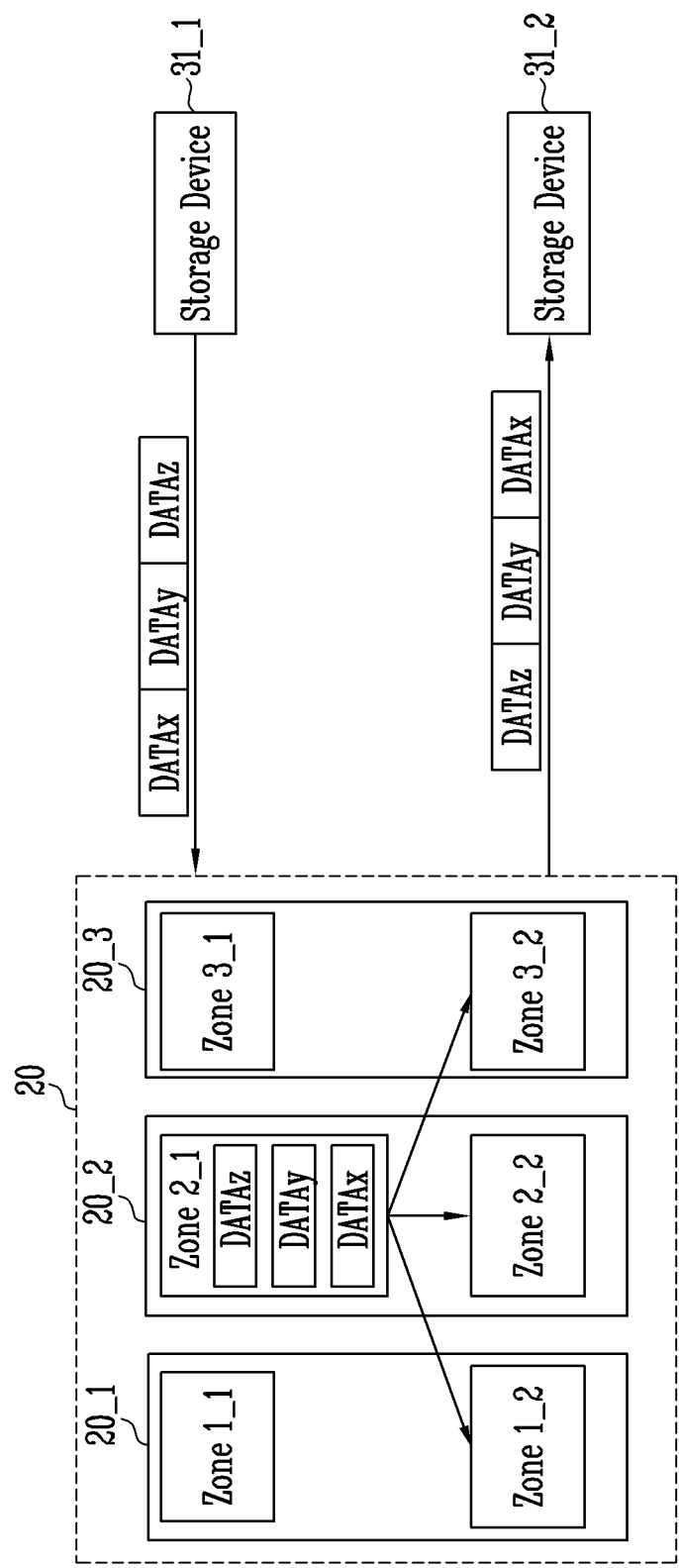
FIG. 6 illustrates an embodiment in which data is moved in a cache tier.

FIG. 6 is a diagram illustrating an embodiment in which data is moved in a cache tier. In describing the embodiment of FIG. 6, the source storage device is the first storage device 31_1, the source zone group is the first zone group Zone Group 1, the target storage device is the second storage device 31_2, and the target zone group is the second zone group Zone Group 2.

In addition, it is assumed that the first data region 20_1 is a hot data region, the second data region 20_2 is a warm data region, and the third data region 20_3 is a cold data region. In addition, it is assumed that each of the (1_1)-th and (1_2)-th data zones Zone 1_1 and Zone 1_2 in the first data region 20_1 is a hot data zone, each of the (2_1)-th and (2_2)-th data zones Zone 2_1 and Zone 2_2 in the second data region 20_2 is a warm data zone, and each of the (3_1)-th and (3_2)-th data zones Zone 3_1 and Zone 3_2 in the third data region 20_3 is a cold data zone.

Referring to FIGS. 2 and 6, in an embodiment, the storage tier controller 11 may control the first storage device 31_1 to perform a read operation of reading the x-th data DATAx, the y-th data DATAy, and the z-th data DATAz stored in the first storage device 31_1. The first storage device 31_1 may output the x-th data DATAx, the y-th data DATAy, and the z-th data DATAz. The storage tier controller 11 may load the x-th data DATAx, the y-th data DATAy, and the z-th data DATAz in the first data zone. Here, the first data zone may be the (2_1)-th data zone Zone 2_1. In this case, the number of times the first data zone is accessed may increase. For example, when the x-th data DATAx, the y-th data DATAy, and the z-th data DATAz are loaded in the (2_1)-th data zone Zone 2_1, the number of times the (2_1)-th data zone Zone 2_1 is accessed may increase by 3.

The cache tier controller 12 may compare a first access count of the data stored in the first data zone with a second access count of the data stored in the second data zone in the second zone group Zone Group 2. Here, the first access count may be an average value of the access counts of the data stored in the (2_1)-th data zone Zone 2_1, e.g., the first average access count. The second access count may be an average value of the access counts of the data stored in the (2_2)-th data zone Zone 2_2, e.g., the second average access count.

In an embodiment, the second data zone in the second zone group Zone Group 2 may be the (2_2)-th data zone Zone 2_2, which is a warm data region.

In an embodiment, the cache tier controller 12 may control the cache tier 20 to move the data loaded in the (2_1)-th data zone Zone 2_1 of the first zone group Zone Group 1 to the target data zone in the second zone group Zone Group 2, based on a result of comparing the first access count and the second access count. In this case, the number of times the target data zone is accessed may not increase.

For example, when the first access count is greater than the second access count, the cache tier controller 12 may control the cache tier 20 to move the data loaded in the (2_1)-th data zone Zone 2_1 of the first zone group Zone Group 1 to the (1_2)-th data zone Zone 1_2 in the second zone group Zone Group 2.

For example, when the first access count is equal to the second access count, the cache tier controller 12 may control the cache tier 20 to move the data loaded in the (2_1)-th data zone Zone 2_1 of the first zone group Zone Group 1 to the (2_2)-th data zone Zone 2_2 in the second zone group Zone Group 2.

For example, when the first access count is less than the second access count, the cache tier controller 12 may control the cache tier 20 to move the data loaded in the (2_1)-th data zone Zone 2_1 of the first zone group Zone Group 1 to the (3_2)-th data zone Zone 3_2 in the second zone group Zone Group 2.

In one embodiment, the second data zone in the second zone group Zone Group 2 may be a zone in which data of the lowest average access count is stored among three data zones in the second zone group Zone Group 2. For example, the average access count of the data stored in the (3_2)-th data zone Zone 3_2 which is a cold data zone may be the lowest among the (1_2)-th, (2_2)-th, and (3_2)-th data zones Zone 1_2, Zone 2_2, and Zone 3_2 in the second zone group Zone Group 2. Therefore, the second data zone may be the (3_2)-th data zone Zone 3_2. However, the present disclosure is not limited thereto.

In one embodiment, the cache tier controller 12 may control the cache tier 20 to move the data loaded in the first data zone (for example, the (2_1)-th data zone Zone 2_1) to the second data zone (for example, the (3_2)-th data zone Zone 3_2), according to whether the first average access count is less than or equal to the second average access count.

In one embodiment, the cache tier controller 12 may reflect (or assign) a weight corresponding to the second storage device 31_2 on the second average access count.

In one embodiment, when the first average access count is greater than the second average access count, the cache tier controller 12 may compare the first average access count with a third average access count of the data stored in the third data zone (for example, the (2_2)-th data zone Zone 2_2), which is a zone where an average access count data, that is lowest next to the second data zone (for example, the (3_2)-th data zone Zone 3_2), is stored. In addition, the cache tier controller 12 may control the cache tier 20 to move the data loaded in the first data zone (for example, the (2_1)-th data zone Zone 2_1) to the second data zone (for example, the (2_2)-th data zone Zone 2_2), according to whether the first average access count is less than or equal to the third average access count.

The storage tier controller 11 may control the storage tier 30 to store the data moved from the first data zone to the second data zone in the second storage device 31_2. In this case, the number of times the target data zone is accessed may increase.

When the average access count of the data stored in the first cache region is greater than the average access count of the data stored in the second cache region, then, in another embodiment, the cache tier controller 12 may load the data stored in the first storage device 31_1 in a warm data zone (for example, the (2_1)-th data zone Zone 2_1) of the first cache region, and may temporarily store data loaded in the warm data zone (for example, the (2_1)-th data zone Zone 2_1) of the first cache region in a hot data zone (for example, the (1_2)-th data zone Zone 1_2) of the second cache region.

In one embodiment, the average access count of the data stored in the first cache region may be greater than the average access count of the data stored in the second cache region. The cache tier controller 12 may temporarily store the data stored in the second storage device 31_2 in a cold data zone (for example, the (3_1)-th data zone Zone 3_1) of the first cache region, and then may store the data, which is temporarily stored in the cold data zone (for example, the (3_1)-th data zone Zone 3_1) of the first cache region, in the first storage device 31_1.

In the embodiment described with reference to FIG. 6, the x-th data DATAx, the y-th data DATAy, and the z-th data DATAz are output from the first storage device 31_1 at one time, and are stored the second storage device 31_2. However, the present disclosure is not limited thereto. As described above with reference to FIG. 3, even though the x-th data DATAx, the y-th data DATAy, and the z-th data DATAz are not output from the first storage device 31_1 at one time, the embodiment shown in FIG. 6 may be applied as it is.

In one embodiment, as described above with reference to FIG. 3, the data moved from the (2_1)-th data zone Zone 2_1 to the (3_2)-th data zone Zone 3_2 may be directly stored in the second storage device 31_2. The data moved from the (2_1)-th data zone Zone 2_1 to the (2_2)-th data zone Zone 2_2 may be moved from the (2_2)-th data zone Zone 2_2 to the (3_2)-th data zone Zone 3_2 and then stored in the second storage device 31_2. The data moved from the (2_1)-th data zone Zone 2_1 to the (1_2)-th data zone Zone 1_2 may be moved to the (3_2)-th data zone Zone 3_2 through the (2_2)-th data zone Zone 2_2 and then stored in the second storage device 31_2.

In accordance with these embodiments, performance of the storage system may be improved by efficiently operating the cache tier 20. Also, a movement operation between storage devices may be performed at a faster rate, as a result of reducing overhead of the movement of data from a first zone to a second zone when the first zone has insufficient storage capacity.

Figure 7:
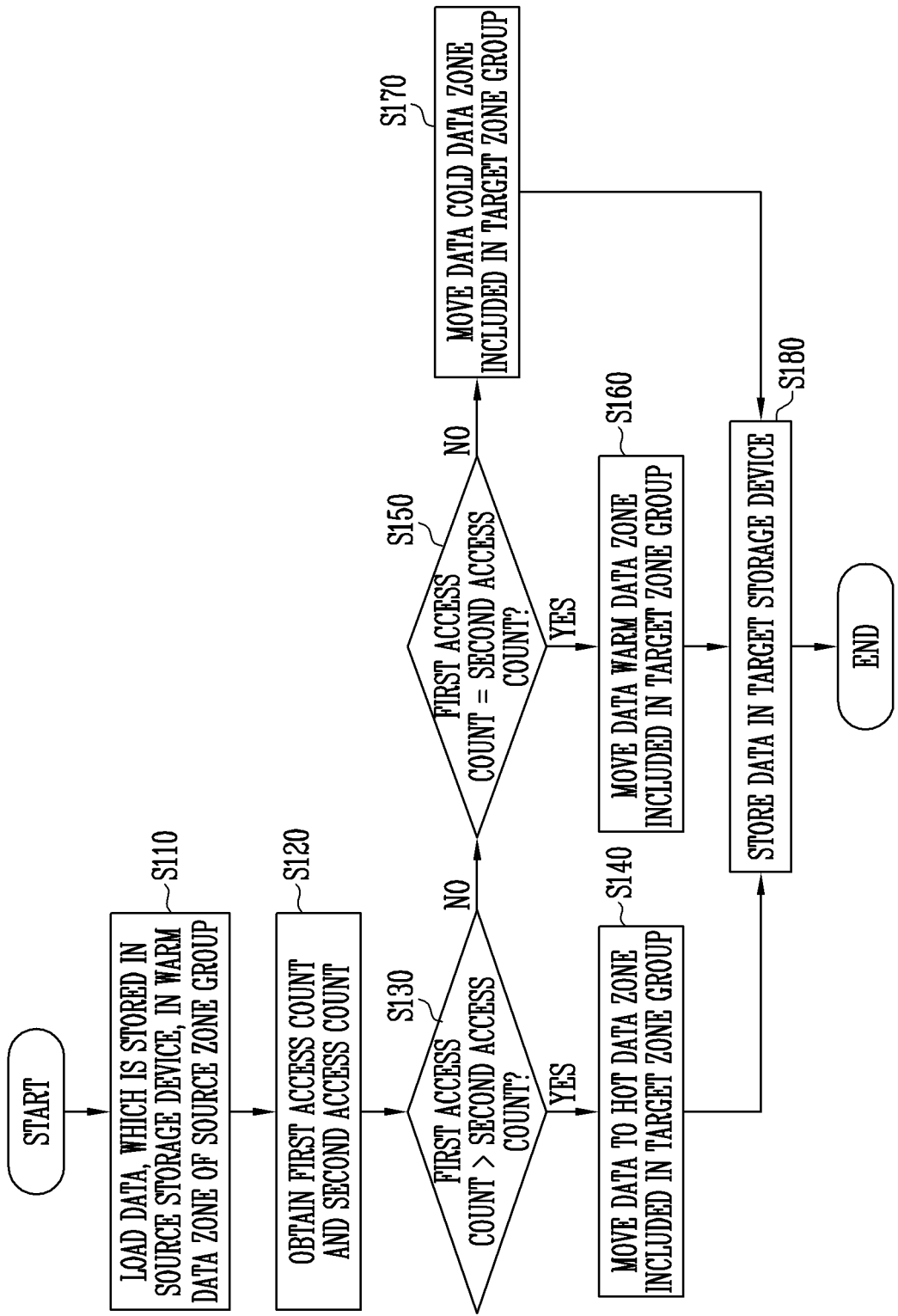
FIG. 7 illustrates an embodiment of a method of operating a storage system.

FIG. 7 is a flowchart illustrating a method of operating a storage system according to an embodiment.

Referring to FIG. 7, the system controller 10 loads data stored in a source storage device in a warm data zone of the source zone group (S110). In one embodiment, the system controller 10 may load data stored in the source storage device in a hot data zone or a cold data zone of the source zone group.

The system controller 10 obtains the first access count and the second access count (S120).

The system controller 10 determines whether the first access count is greater than the second access count (S130).

When the first access count is greater than the second access count (S130, Yes), the system controller 10 moves the data stored in the warm data zone of the source zone group to the hot data zone in the target zone group (S140).

When the first access count is not greater than the second access count (S130, NO), the system controller 10 determines whether the first access count is equal to the second access count (S150).

When the first access count is equal to the second access count (S150, Yes), the system controller 10 moves the data stored in the warm data zone of the source zone group to the warm data zone in the target zone group (S160).

When the first access count is less than the second access count (S150, No), the system controller 10 moves the data stored in the warm data zone of the source zone group to the cold data zone in the target zone group (S170).

After the data is moved to the target data zone in the target zone group, the system controller 10 stores the data stored in the target data zone in the target storage device (S180).

Figure 8:
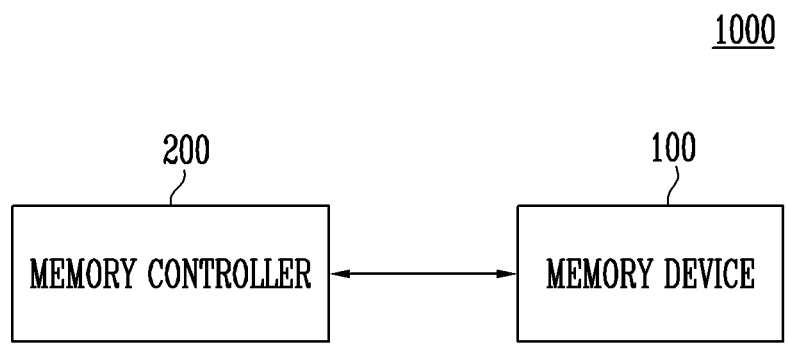
FIG. 8 illustrates an embodiment of a storage device.

FIG. 8 is a diagram illustrating an embodiment of a storage device 1000. Referring to FIGS. 1 and 8, the storage device 1000 may be, for example, one of the plurality of storage devices 31_1, 31_2, and 31_n shown in FIG. 1.

The storage device 1000 may be or be included in a device that stores data according to a request of the system controller 10. Examples include a cellular phone, a smartphone, an MP3 player, a laptop computer, a desktop computer, a game player, a TV, a tablet PC, or an in-vehicle infotainment system. When the system controller 10 is a host, the storage device 1000 may be a device that stores data based on a request of the host.

The storage device 1000 may be manufactured as one of various types of storage devices according, for example, to a host interface that implements a communication method with the system controller 10. For example, the storage device 1000 may be configured as an SSD, a multimedia card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, and a memory stick.

The storage device 1000 may be manufactured as one of various types of packages. Examples include a package on package (POP), a system in package (SIP), a system on chip (SOC), a multi-chip package (MCP), a chip on board (COB), a wafer-level fabricated package (WFP), and a wafer-level stack package (WSP).

The storage device 1000 may include a memory device 100 and a memory controller 200. The memory device 100 may operate in response to control of the memory controller 200. For example, the memory device 100 may receive a command and an addresses from the memory controller 200 and access a memory cell selected by the address among memory cells. The memory device 100 may perform an operation instructed by the command on the memory cell selected by the address. Examples of the command include a program command, a read command, and an erase command. Examples of the operation instructed by the command include a program operation (or a write operation), a read operation, or an erase operation.

A program operation may be an operation in which the memory device 100 stores write data provided from the system controller 10 in response to control of the memory controller 200. For example, the memory device 100 may receive a program command, an address, and data and may program the data in a memory cell selected by the address. Data to be programmed in the selected memory cell may be referred to as write data.

A read operation may be an operation in which the memory device 100 reads read data stored in the memory device 100 in response to the control of the memory controller 200. For example, the memory device 100 may receive a read command and an address, and read data from a region selected by the address in the memory cell array. Data to be read from the selected region (among data stored in the memory device 100) may be referred to as the read data.

An erase operation may be an operation in which the memory device 100 erases the data stored in the memory device in response to the control of the memory controller 200. For example, the memory device 100 may receive an erase command and an address, and erase data stored in a region selected by the address.

The memory device 100 may be implemented with a volatile memory device or a nonvolatile memory device. Examples of a volatile memory device include a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a resistive random access memory (RRAM), a phase-change random access memory (PRAM), a magnetoresistive random access memory (MRAM), a ferroelectric random access memory, and a spin transfer torque magnetoresistive random access memory.

Examples of a nonvolatile memory device include various types of flash memory, e.g., a NAND flash memory, a vertical NAND flash memory (vertical NAND), and a NOR flash memory. For convenience of description and as an example, it is assumed that memory device 100 is a NAND flash memory.

The memory device 100 may store write data under control of the memory controller 200, or may read stored data and provide the read data to the memory controller 200.

The memory device 100 may include a plurality of dies. One die may include at least one plane, and one plane may include a memory cell array that include memory cells storing data. The memory cell array may include a plurality of memory blocks. A memory block may be, for example, a unit that performs an operation of erasing data. The memory block may include a plurality of pages. A page may be, for example, a unit that performs a program operation of storing write data or a read operation of reading stored read data.

The memory controller 200 may control overall operation of the storage device 1000. When power is applied to the storage device 1000, the memory controller 200 may execute instructions, e.g., firmware. When the memory device 100 is a flash memory device, the firmware may include a host interface layer, a flash translation layer, and a flash interface layer. The host interface layer may control an operation between the system controller 10 and the memory controller 200. The flash translation layer may convert a logical address from the system controller 10 to a physical address. The flash interface layer may control communication between the memory controller 200 and the memory device 100.

The memory controller 200 may control the memory device 100 to perform program operations, read operations, and erase operations in response to write requests, read requests, and erase requests, respectively, of the system controller 10.

During a program operation, the memory controller 200 may provide a program command, physical addresses, and write data to the memory device 100.

During a read operation, the memory controller 200 may provide a read command and physical address to the memory device 100.

During an erase operation, the memory controller 200 may provide an erase command and physical address to the memory device 100.

In one embodiment, the memory controller 200 may generate commands, addresses, and data autonomously regardless of a request from the system controller 10. The memory controller 200 may transmit the autonomously generated commands, addresses, and data to the memory device 100.

For example, the memory controller 200 may generate one or more commands, addresses, and data for performing a background operation, and may provide the one or more commands, addresses, and data to the memory device 100.

Examples of a background operation include wear leveling, read reclaim, and garbage collection. A wear leveling operation may correspond, for example, to static wear leveling, dynamic wear leveling, or another type of wear leveling. Static wear leveling may include an operation of storing the number of times memory blocks are erased and moving cold data (e.g., in which an erase operation or a write operation seldom occurs, e.g., below a predetermined number) to a memory block having the largest number of erase times. Dynamic wear leveling may include an operation of storing the number of times memory blocks are erased and programming data in a memory block having the least number of erase times.

Read reclaim may include an operation of moving data stored in one memory block to another memory block before an uncorrectable error occurs in data stored in the one memory block.

Garbage collection may include an operation of copying valid data in a bad memory block to a free memory block and erasing invalid data in the bad block. Copying the valid data in the bad memory block to the free memory block may include moving the valid data in the bad block to the free block.

The storage device 1000 may further include a buffer memory. In an embodiment, the buffer memory may be included in the memory controller 200. Examples of the buffer memory include, but are not limited to, a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a resistive random access memory (RRAM), a phase-change random access memory (PRAM), a magnetoresistive random access memory (MRAM), a ferroelectric random access memory, and a spin transfer torque magnetoresistive random access memory.

The memory controller 200 may control two or more memory devices 100. In this case, the memory controller 200 may control the memory devices 100, for example, according to an interleaving method to improve operation performance. The interleaving method may include a method of controlling operations of two or more memory devices 100 to overlap.

Figure 9:
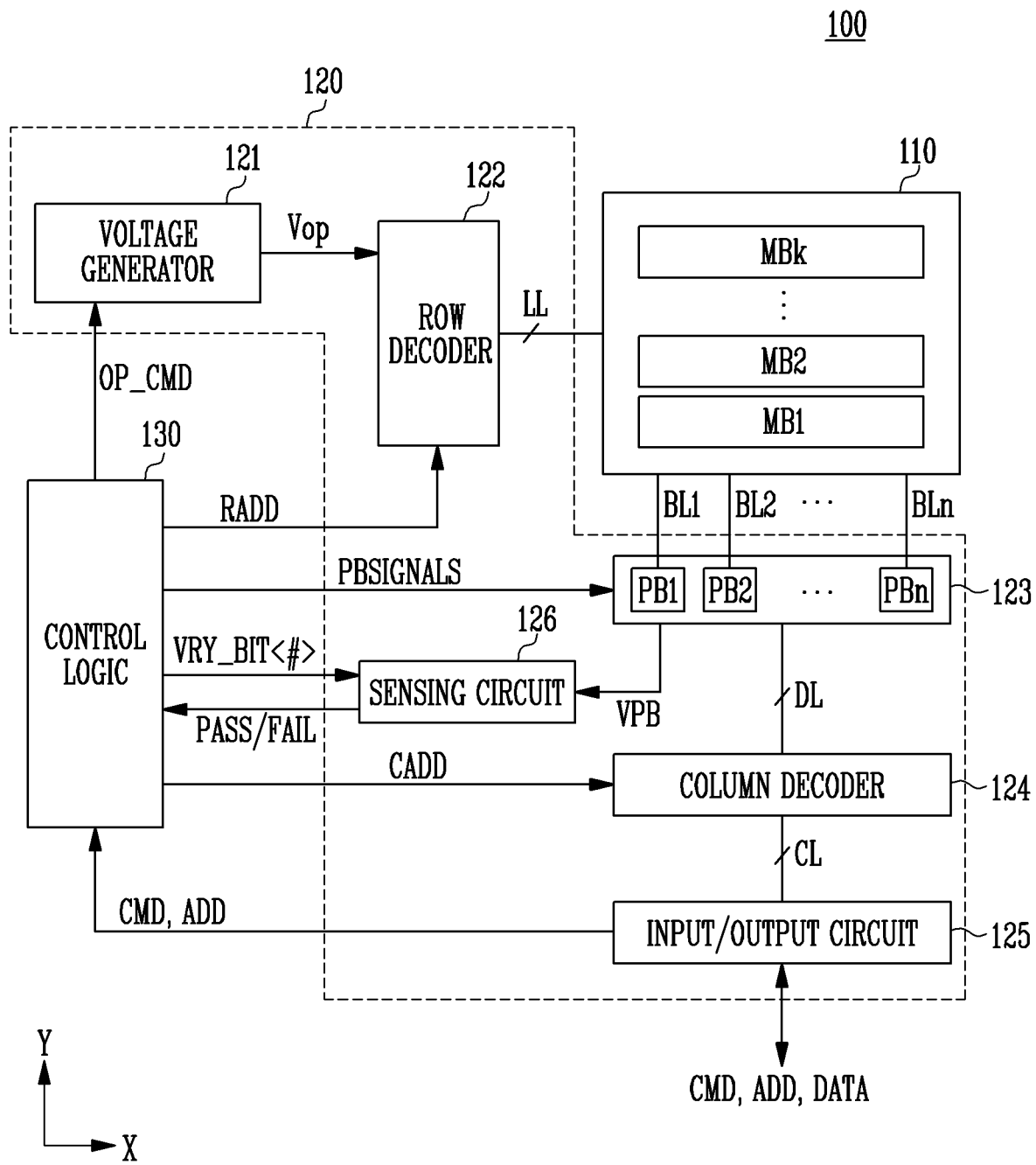
FIG. 9 illustrates an embodiment of a memory device.

FIG. 9 is a diagram illustrating a memory device 100 according to an embodiment.

Referring to FIG. 9, the memory device 100 may include a memory cell array 110, a peripheral circuit 120, and a control logic 130. The memory cell array 110 may include a plurality of memory blocks MB1 to MBk (k is a positive integer). Here, the number of the plurality of memory blocks MB1 to MBk is only an example for describing embodiments, but are not limited thereto.

Each of the memory blocks MB1 to MBk may be connected to local lines LL and bit lines BL1 to BLn (n is a positive integer). The local lines LL may be connected to a row decoder 122 and to each of the memory blocks MB1 to MBk. The local lines LL may include a first select line, a second select line, and a plurality of word lines arranged between the first select line and the second select lines. In one embodiment, the local lines LL may include one or more dummy lines arranged between the first select line and the word lines, one or more dummy lines arranged between the second select line and the word lines, and one or more pipelines.

The bit lines BL1 to BLn may be commonly connected to the memory blocks MB1 to MBk.

The memory blocks MB1 to MBk may be implemented as a two-dimensional or three-dimensional structure. For example, memory cells may be arranged in a direction parallel to a substrate when the memory blocks MB1 to MBk have a two-dimensional structure. Memory cells may be stacked on a substrate in a vertical direction when the memory blocks MB1 to MBk have a three-dimensional structure.

The peripheral circuit 120 may include a voltage generator 121, the row decoder 122, a page buffer group 123, a column decoder 124, an input/output circuit 125, and a sensing circuit 126. The voltage generator 121 may generate various operation voltages Vop used for program operations, read operations, and erase operations in response to corresponding operations command OP_CMD. In addition, the voltage generator 121 may selectively discharge the local lines LL in response to an operation command OP_CMD. For example, the voltage generator 121 may generate a program voltage, a verify voltage, pass voltages, a turn-on voltage, a read voltage, an erase voltage, a source line voltage, and/or other voltages under control of the control logic 130.

In an embodiment, the voltage generator 121 may generate an internal power voltage by regulating an external power voltage. The internal power voltage generated by the voltage generator 121 may be used as an operation voltage of the memory device 100.

In an embodiment, the voltage generator 121 may generate a plurality of voltages using an external power voltage or an internal power voltage. For example, the voltage generator 121 may include a plurality of pumping capacitors that receive the internal power voltage and generate a plurality of voltages by selectively activating the plurality of pumping capacitors in response to the control of the control logic 130. The generated voltages may be supplied to the memory cell array 110 by the row decoder 122.

The row decoder 122 may transfer the operation voltages Vop to the local lines LL in response to a row address RADD. The operation voltages Vop may be transferred to selected memory blocks MB1 to MBk through the local lines LL. For example, during a program operation, the row decoder 122 may apply the program voltage to a selected word line and a program pass voltage of a level less than that of the program voltage to unselected word lines.

In one embodiment, during a program verify operation, the row decoder 122 may apply the verify voltage to the selected word line and may apply a verify pass voltage greater than the verify voltage to the unselected word lines.

In one embodiment, during a read operation, the row decoder 122 may apply the read voltage to the selected word line and may apply a read pass voltage greater than the read voltage to the unselected word lines.

In one embodiment, during an erase operation, the row decoder 122 may select one memory block according to a decoded address. During the erase operation, the row decoder 122 may apply a ground voltage to word lines connected to the selected memory block.

The page buffer group 123 may include first to n-th page buffers PB1 to PBn connected to the memory cell array 110 through the first to n-th bit lines BL1 to BLn, respectively. The first to n-th page buffers PB1 to PBn may operate in response to the control of the control logic 130. For example, the first to n-th page buffers PB1 to PBn may operate in response to page buffer control signals PBSIGNALS. In one embodiment, the first to n-th page buffers PB1 to PBn may temporarily store data received through the first to n-th bit lines BL1 to BLn or may sense a voltage or a current of the bit lines BL1 to BLn during the read operation or the verify operation.

During a program operation, when the program voltage is applied to the selected word line, the first to n-th page buffers PB1 to PBn may transfer data DATA received through the column decoder 124 and the input/output circuit 125 and to the selected memory cells through the first to n-th bit lines BL1 to BLn. The memory cells of the selected page are programmed according to the transferred data DATA. The memory cell connected to the bit line to which a program permission voltage (for example, a ground voltage) is applied may have an increased threshold voltage. The threshold voltage of the memory cell connected to the bit line to which a program inhibit voltage (for example, a power voltage) is applied may be maintained.

During a verify operation, the first to n-th page buffers PB1 to PBn may sense the data stored in the memory cells selected through the first to n-th bit lines BL1 to BLn from the selected memory cells.

During a read operation, the first to n-th page buffers PB1 to PBn may sense the data DATA from the memory cells of the selected page through the first to n-th bit lines BL1 to BLn, and output the sensed data DATA to the input/output circuit 125 under control of the column decoder 124.

During an erase operation, the first to n-th page buffers PB1 to PBn may float the first to n-th bit lines BL1 to BLn.

The column decoder 124 may transfer data between the input/output circuit 125 and the page buffer group 123 in response to a column address CADD. For example, the column decoder 124 may exchange data with the page buffers PB1 to PBn through data lines DL, or may exchange data with the input/output circuit 125 through column lines CL.

The input/output circuit 125 may transfer the command CMD and the address ADD received from the memory controller 200 to the control logic 130, or may exchange data DATA with the column decoder 124.

During a read operation or verify operation, the sensing circuit 126 may generate a reference current in response to a permission bit signal VRY_BIT<#> and compare a sensing voltage VPB received from the page buffer group 123 with a reference voltage generated by the reference current to output a pass signal PASS or a fail signal FAIL.

The control logic 130 may output the operation command OP_CMD, the row address RADD, the page buffer control signals PBSIGNALS, and the permission bit VRY_BIT<#> in response to the command CMD and the address ADD to control the peripheral circuit 120.

Figure 10:
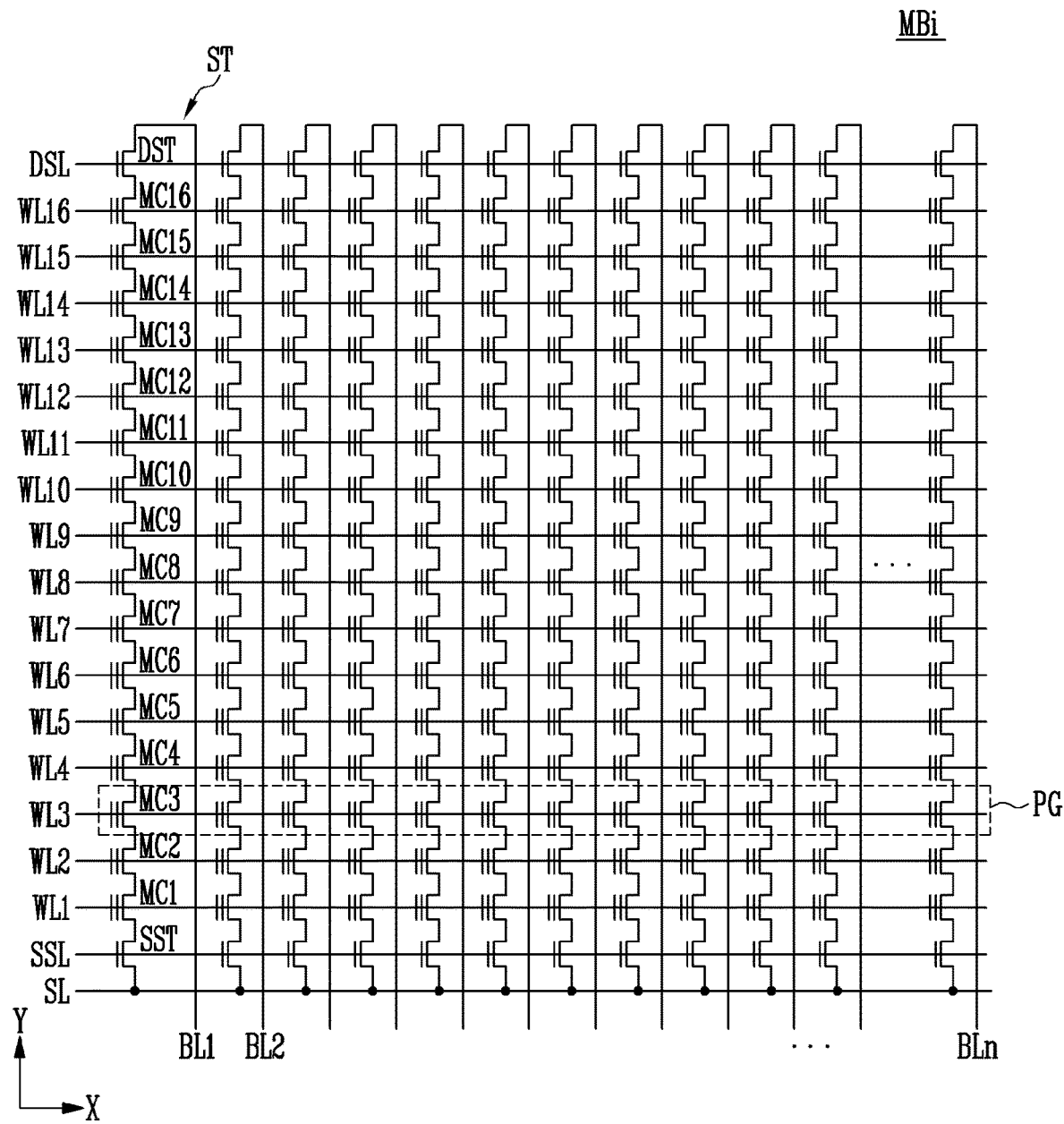
FIG. 10 illustrates an embodiment of a memory block.

FIG. 10 is a diagram illustrating an embodiment of a memory block MBi which, for example, may be representative of the memory blocks MB1 to MBk shown in FIG. 9.

Referring to FIG. 10, the memory block MBi may include a first select line, a second select line, a plurality of word lines WL1 to WL16, a source line SL, a plurality of bit lines BL1 to BLn, and a plurality of strings ST. The first select line may be, for example, a source select line SSL. Hereinafter, it is assumed that the first select line is the source select line SSL.

The second select line may be, for example, a drain select line DSL. Hereinafter, it is assumed that the second select line is the drain select line DSL.

The plurality of word lines WL1 to WL16 may be arranged in parallel between the source select line SSL and the drain select line DSL. The number of word lines WL1 to WL16 shown in FIG. 10 is an example and may be a different number in another embodiment.

The source line SL may be commonly connected to the plurality of strings ST.

The plurality of bit lines BL1 to BLn may be connected to the plurality of strings ST, respectively.

The plurality of strings ST may be connected to the bit lines BL1 to BLn and the source line SL.

Since the plurality of strings ST may be configured to be identical to each other, the string ST connected to the first bit line BL1 is described as a representative example.

The string ST may include a plurality of memory cells MC1 to MC16, at least one first select transistor, and at least one second select transistor. The plurality of memory cells MC1 to MC16 may be connected in series between a source select transistor SST and a drain select transistor DST. Gates of the memory cells MC1 to MC16 may be connected to the plurality of word lines WL1 to WL16, respectively. Therefore, in one embodiment, the number of memory cells MC1 to MC16 included in one string ST may be the same as the number of word lines WL1 to WL16. Any one of the plurality of memory cells MC1 to MC16 may be configured of any one of the SLC, the MLC, the TLC, and the QLC.

A group of memory cells connected to the same word line (among memory cells in different strings ST) may be referred to as a physical page PG. Therefore, the memory block MBi may include a physical pages PG corresponding to the number of word lines WL1 to WL16. Hereinafter, it is assumed that memory cells (e.g., MC3) in the physical page PG are selected memory cells.

The first select transistor may be, for example, a source select transistor SST. Hereinafter, it is assumed that the first select transistor is the source select transistor SST.

The source select transistor SST may have a first electrode connected to the source line SL, a second electrode connected to the first memory cell MC1 among the plurality of memory cells MC1 to MC16, and a gate electrode connected to the source select line SSL.

The second select transistor may be, for example, a drain select transistor DST. Hereinafter, it is assumed that the second select transistor is the drain select transistor DST.

The drain select transistor DST may have a first electrode connected to the sixteenth memory cell MC16 among the plurality of memory cells MC1 to MC16, a second electrode connected to the first bit line BL1, and a gate electrode connected to the drain select line DSL.

Figure 11:
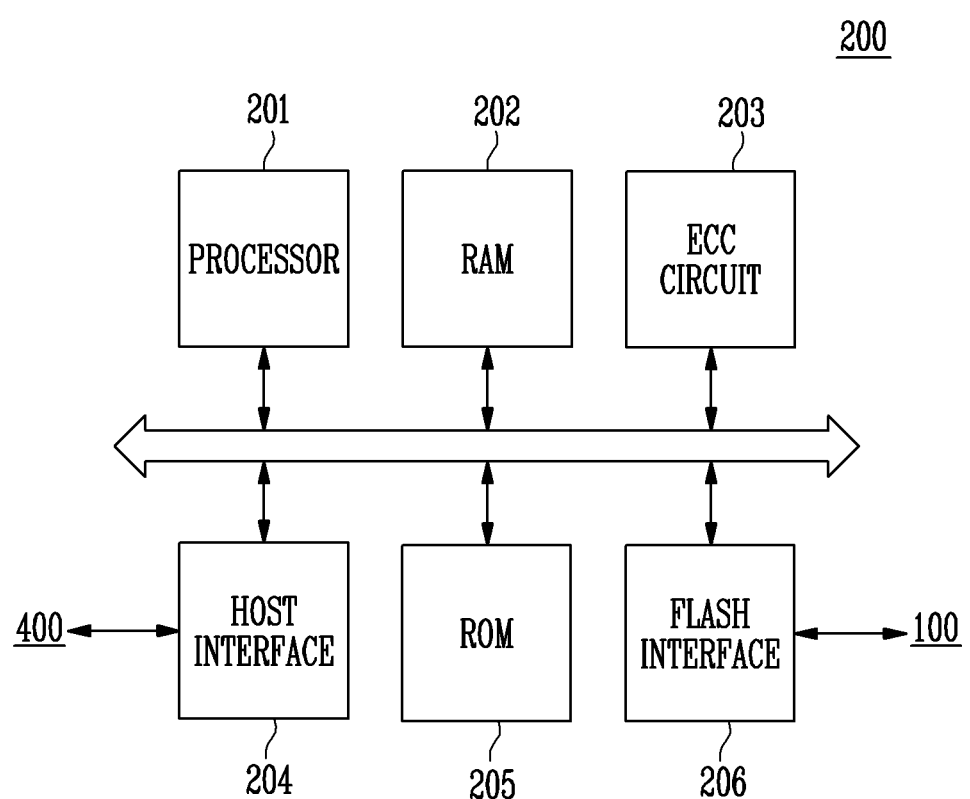
FIG. 11 illustrates an embodiment of a memory controller.

FIG. 11 is a diagram illustrating an embodiment of a memory controller 200, which may include a processor 201, a RAM 202, an error correction circuit 203, a host interface 204, a ROM 205, and a flash interface 206.

The processor 201 may control overall operation of the memory controller 200.

The RAM 202 may be used, for example, as a buffer memory, a cache memory, or an operation memory of the memory controller 200.

The error correction circuit 203 may generate an error correction code (ECC) for correcting a fail bit or an error bit of data received from the memory device 100. The error correction circuit 203 may perform error correction encoding of data provided to the memory device 100 to generate data to which a parity bit is added. The parity bit may be stored in the memory device 100.

In addition, the error correction circuit 203 may perform error correction decoding on the data output from the memory device 100. At this time, the error correction circuit 203 may correct an error using parity. For example, the error correction circuit 203 may correct the error using modulations based on various type of codes. Examples include an LDPC code, a BCH code, a turbo code, a Reed-Solomon code, a convolution code, an RSC, a TCM, and a BCM.

The error correction circuit 203 may calculate an error correction code value of data to be programmed to the memory device 100 in the program operation. The error correction circuit 203 may perform an error correction operation based on the error correction code value on data read from the memory device 100 in the read operation. The error correction circuit 203 may perform an error correction operation of data recovered from the memory device 100 in a recovery operation of failed data.

The memory controller 200 may communicate with an external device (for example, host 400, an application processor, or another device) through the host interface 204.

The ROM 205 may store various types of information to operate the memory controller 200, for example, in firmware form.

The memory controller 200 may communicate with the memory device 100 through the flash interface 206. The memory controller 200 may transmit a command CMD, an address ADDR, a control signal CTRL, and or other signals to the memory device 100 and may receive data through the flash interface 206. The flash interface 206 may include, for example, a NAND interface.

Figure 12:
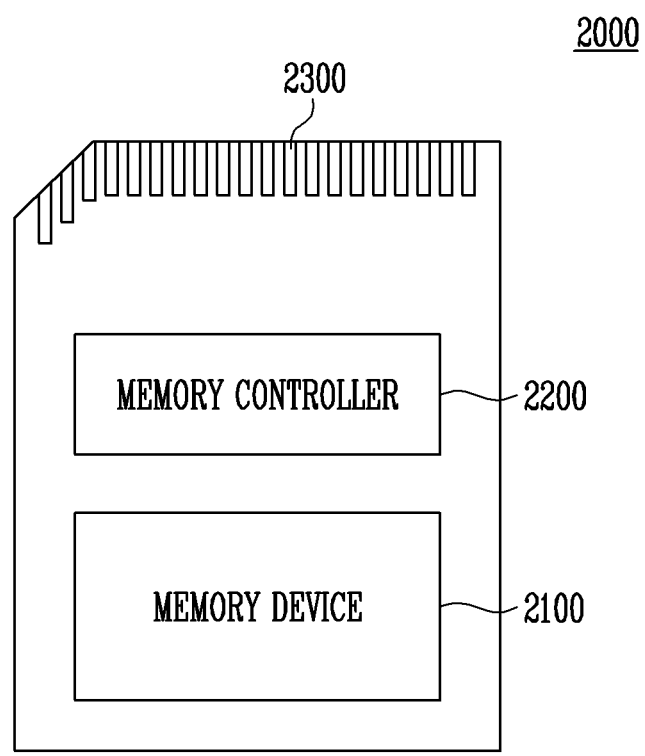
FIG. 12 illustrates an embodiment of a memory card system.

FIG. 12 is a block diagram illustrating an embodiment of a memory card system 2000 to which a storage device according to any of the embodiments described herein may be applied.

Referring to FIG. 12, the memory card system 2000 includes a memory device 2100, a memory controller 2200, and a connector 2300. The memory device 2100 may be configured, for example, of various types of nonvolatile memory. Examples include an electrically erasable and programmable ROM (EEPROM), a NAND flash memory, a NOR flash memory, a phase-change RAM (PRAM), a resistive RAM (ReRAM), a ferroelectric RAM (FRAM), and a spin transfer torque magnetoresistive RAM (STT-MRAM).

The memory controller 2200 is connected to the memory device 2100 and may be configured to access the memory device 2100. For example, the memory controller 2200 may be configured to control read, write, erase, and/or background operations of the memory device 2100. The memory controller 2200 may serve as an interface between the memory device 2100 and the host 400. The memory controller 2200 may be configured to drive instructions (e.g., firmware) for controlling the memory device 2100. In one embodiment, the memory controller 2200 may operate in a same manner as memory controller 200 described with reference to FIG. 8, but may operate in a different manner in another embodiment.

The memory controller 2200 may include one or more components. Examples include a random access memory (RAM), a processor, a host interface, a memory interface, and an error correction circuit.

The memory controller 2200 may communicate with an external device through the connector 2300. The memory controller 2200 may communicate with an external device (for example, host 400) according to a specific communication standard or protocol. For example, the memory controller 2200 is configured to communicate with an external device through at least one of various communication standards or protocols, including but not limited to a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. Connector 2300 may be classified by at least one of the various communication standards or protocols described above.

The memory device 2100 and the memory controller 2200 may be integrated into one semiconductor device to configure a memory card. For example, the memory controller 2200 and the memory device 2100 may be integrated into one semiconductor device to configure a memory card. Examples of the memory card include a PC card (personal computer memory card international association (PCMCIA)), a compact flash card, a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 13:
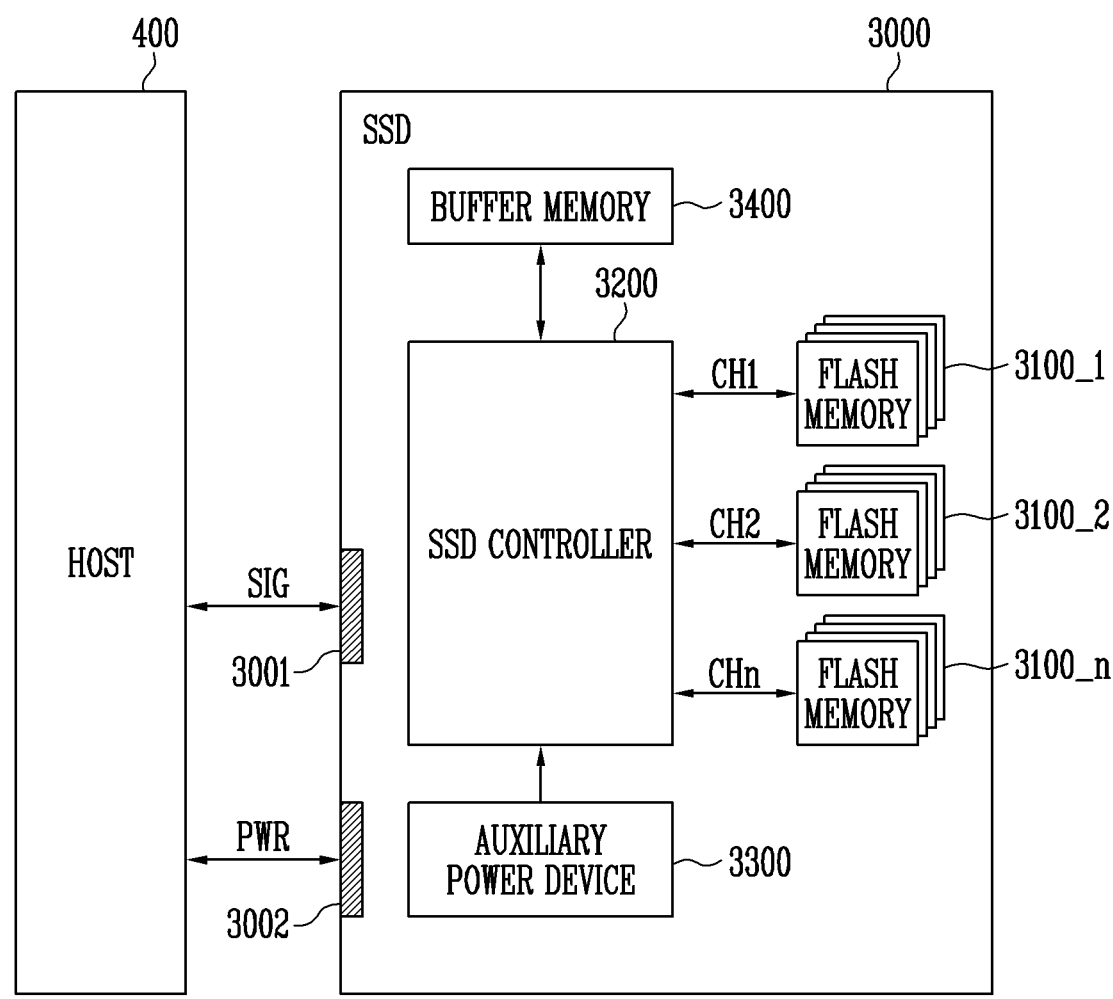
FIG. 13 illustrates an embodiment of a solid state drive (SSD) system.

FIG. 13 is a block diagram illustrating an embodiment of a solid state drive (SSD) system to which a storage device according to the embodiment described herein may be applied.

Referring to FIG. 13, the SSD system includes the host 400 and an SSD 3000. The SSD 3000 exchanges a signal SIG with the host 400 through a signal connector 3001 and receives power PWR through a power connector 3002. The SSD 3000 may include an SSD controller 3200, a plurality of flash memories 3100_1, 3100_2, and 3100_n, an auxiliary power device 3300, and a buffer memory 3400.

According to an embodiment, the SSD controller 3200 may perform the function of the memory controller 200, for example, as described with reference to FIG. 8. The SSD controller 3200 may control the plurality of flash memories 3100_1, 3100_2, and 3100_n in response to the signal SIG received from the host 400. In one embodiment, the signal SIG may be based on an interface between the host 400 and the SSD 3000. For example, the signal SIG may be a signal defined by at least one of interfaces such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The auxiliary power device 3300 is connected to the host 400 through the power connector 3002, and may receive the power PWR from the host 400 and may charge the power. The auxiliary power device 3300 may provide power of the SSD 3000 when power supply from the host 400 is not smooth or otherwise does not correspond to a predetermined level or pattern. For example, the auxiliary power device 3300 may be in the SSD 3000 or external and electrically coupled to the SSD 3000. For example, the auxiliary power device 3300 may be on a main board and may provide auxiliary power to the SSD 3000.

The buffer memory 3400 may temporarily store data, for example, received from the host 400 or from one or more of the plurality of flash memories 3100_1, 3100_2, and 3100_n. In one embodiment, the buffer memory 3400 may temporarily store meta data (for example, a mapping table) of the flash memories 3100_1, 3100_2, and 3100_n. The buffer memory 3400 may include a volatile memory (e.g., DRAM, SDRAM, DDR SDRAM, LPDDR SDRAM, GRAM, etc.) or a nonvolatile memory such as an FRAM, a ReRAM, an STT-MRAM, and a PRAM.

Figure 14:
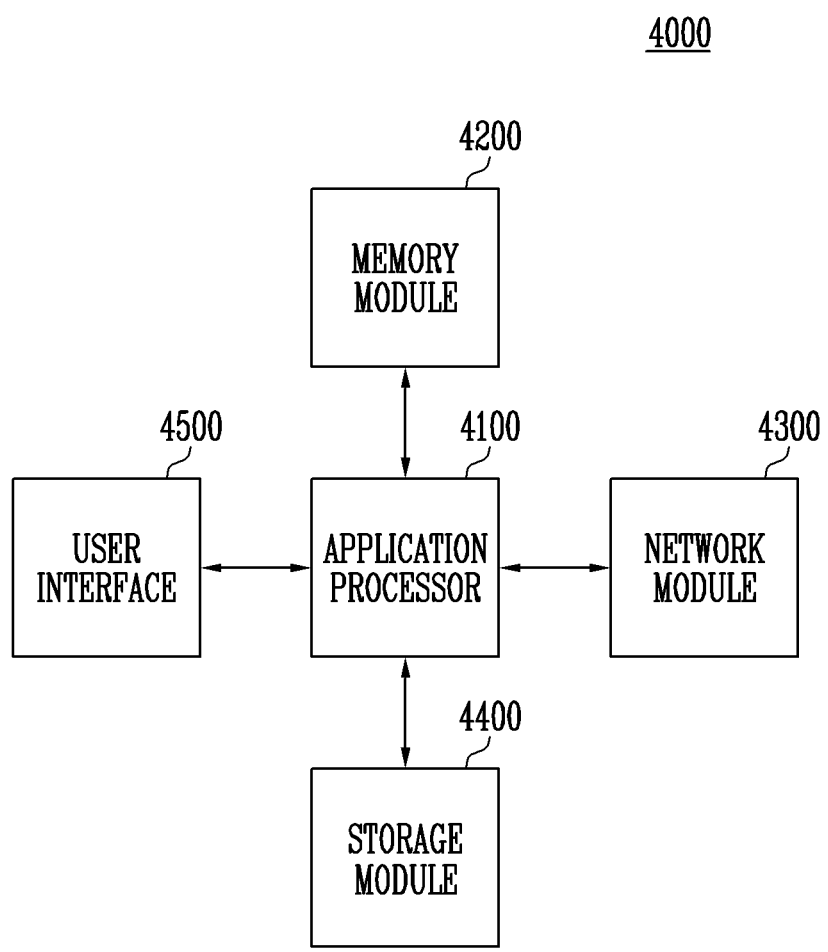
FIG. 14 illustrates an embodiment of a user system.

FIG. 14 is a block diagram illustrating an embodiment of a user system 4000 to which a storage device according to any of the embodiments described herein may be applied.

Referring to FIG. 14, the user system 4000 includes an application processor 4100, a memory module 4200, a network module 4300, a storage module 4400, and a user interface 4500. The application processor 4100 may drive components, an operating system (OS), a user program, or other features in the user system 4000. For example, the application processor 4100 may include controllers, interfaces, graphics engines, and other features that control the components in the user system 4000. The application processor 4100 may be provided, for example, as a system-on-chip (SoC).

The memory module 4200 may operate as a main memory, an operation memory, a buffer memory, or a cache memory of the user system 4000. The memory module 4200 may include a volatile random access memory (e.g., a DRAM, an SDRAM, a DDR SDRAM, a DDR2 SDRAM, a DDR3 SDRAM, an LPDDR SDRAM, an LPDDR2 SDRAM, an LPDDR3 SDRAM, etc.) or a nonvolatile random access memory such as a PRAM, a ReRAM, an MRAM, and an FRAM. In one embodiment, the application processor 4100 and memory module 4200 may be packaged based on a package on package (POP) and provided as one semiconductor package.

The network module 4300 may communicate with external devices, for example, through one or more forms of wireless communication. Examples include code division multiple access (CDMA), global system for mobile communications (GSM), wideband CDMA (WCDMA), CDMA-2000, time division multiple access (TDMA), long term evolution, Wimax, WLAN, UWB, Bluetooth, and Wi-Fi. For example, the network module 4300 may be included in the application processor 4100.

The storage module 4400 may store data, for example, received from the application processor 4100. In one embodiment, the storage module 4400 may transmit data stored in the storage module 4400 to the application processor 4100. For example, the storage module 4400 may be implemented with a nonvolatile semiconductor memory. Examples include a phase-change RAM (PRAM), a magnetic RAM (MRAM), a resistive RAM (RRAM), a NAND flash, a NOR flash, and a three-dimensional NAND flash. In one embodiment, the storage module 4400 may be provided as a removable storage device (removable drive) such as a memory card, and an external drive of the user system 4000.

In one embodiment, the storage module 4400 may operate in a same manner as the storage device 1000 described with reference to FIG. 8. The storage module 4400 may include a plurality of nonvolatile memory devices, which may operate in a same manner as the memory device 100 described with reference to FIG. 8.

The user interface 4500 may include interfaces for inputting data or instructions to the application processor 4100 and/or for outputting data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as a liquid crystal display (LCD), an organic light emitting diode (OLED) display device, an active matrix OLED (AMOLED) display device, an LED, a speaker, and a monitor.

In one embodiment, an apparatus includes a storage area to store instructions and a controller configured to execute the instructions to control a first storage device and a cache tier. The storage area may be a non-transitory computer-readable medium storing instructions that may correspond to firmware or other types of instructions which, when executed by the controller, perform operations as described herein.

The cash tier may correspond to any embodiment of the cash tier previously described, and, for example, may include a first zone group and a second zone group, each including a plurality of data zones.

By executing the instructions, the controller may perform a load operation to load data stored in the first storage device in a source data zone that corresponds to one of the plurality of data zones in the first zone group. Additionally, the controller may execute the instructions to perform a move operation to move the data loaded in the source data zone to a target data zone that corresponds to one of the plurality of data zones in the second zone group.

The move operation may be performed based on a first access count and a second access count, where the first access count corresponds to a number of access times of the source data zone and the second access count corresponds to a number of access times of a reference data zone that corresponds to one of the plurality of data zones in the second zone group.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented in at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device.

Although various embodiments have been described for illustrative purposes, it will be apparent to those skilled in the art that various changes and modifications may be made without departing from the spirit and scope of the disclosure as defined in the following claims. The embodiments may be combined to form additional embodiments.

What is claimed is:

1. A storage system comprising:
 a first storage device;
 a second storage device;
 a cache tier including a first zone group and a second zone group configured to temporarily store data, respectively; and a system controller configured to move data stored in the first storage device to the cache tier and move the data moved to the cache tier to the second storage device, wherein the first zone group is allocated to the first storage device, wherein the second zone group is allocated to the second storage device, wherein each of the first zone group and the second zone group includes a plurality of data zones configured to store data based on a number of times the data is accessed, and includes a hot data zone, a warm data zone, and a cold data zone, wherein the system controller is configured to:

load the data stored in the first storage device in a source data zone included in the first zone group, and move the data loaded in the source data zone to a target data zone included in the second zone group, based on a first access count and a second access count, wherein the first access count corresponds to a number of access times of the source data zone and the second access count corresponds to a number of access times of a reference data zone included in the second zone group, wherein the target data zone is determined among the hot data zone, the warm data zone, and the cold data zone based on a comparison result of the first access count and the second access count, wherein an average value of access counts of data stored in the target data zone is greater than an average value of access counts of data stored in the reference data zone when the first access count is greater than the second access count.

2. The storage system of claim 1, wherein the system controller comprises:

a storage tier controller configured to control the first storage device to perform a read operation of reading the data stored in the first storage device, and to control the second storage device to perform a write operation of storing the data moved to the target data zone in the second storage device;

an access count storage configured to store access count information indicating a number of times the data stored in each of the first zone group and the second zone group is accessed; and a cache tier controller configured to obtain the first access count and the second access count based on the access count information, to compare the first access count and the second access count, and to control the cache tier to move the data loaded in the source data zone to the target data zone according to the comparison result.

3. The storage system of claim 2, wherein the cache tier controller is configured to:

calculate an average value of access counts of the data stored in the source data zone as the first access count, and calculate an average value of access counts of the data stored in the reference data zone as the second access count.

4. The storage system of claim 2, wherein an average value of access counts of data stored in the hot data zone in the first zone group is greater than an average value of access counts of data stored in the warm data zone in the first zone group, and the average value of the access counts of the data stored in the warm data zone in the first zone group is greater than an average value of access counts of data stored in the cold data zone in the first zone group.

5. The storage system of claim 4, wherein the source data zone is the warm data zone in the first zone group, the reference data zone is the warm data zone in the second zone group, the target data zone is the hot data zone in the second zone group, and the cache tier controller is configured to control the cache tier to move the data loaded in the source data zone to the hot data zone corresponding to the target data zone in the second zone group when the first access count is greater than the second access count.

6. The storage system of claim 4, wherein:

the source data zone is the warm data zone in the first zone group, the reference data zone and the target data zone are the warm data zones in the second zone group, and the cache tier controller is configured to control the cache tier to move the data loaded in the source data zone to the warm data zone corresponding to the target data zone in the second zone group when the first access count is equal to the second access count.

7. The storage system of claim 4, wherein:

the source data zone is the warm data zone in the first zone group, the reference data zone is the warm data zone in the second zone group, the target data zone is the cold data zone in the second zone group, and the cache tier controller is configured to control the cache tier to move the data loaded in the source data zone to the cold data zone corresponding to the target data zone in the second zone group when the first access count is less than the second access count.

8. The storage system of claim 2, wherein the cache tier controller is configured to:

assign a weight corresponding to the second storage device, selected among preset weights, to the second access count, and control the cache tier to move the data loaded in the source data zone to the target data zone according to a result of comparing the first access count with a second access count in which the weight corresponding to the second storage device is assigned.

9. The storage system of claim 2, wherein:

when a size of data stored in the hot data zone in the second zone group meets a storage capacity of the hot data zone in the second zone group, the cache tier controller is configured to control the cache tier to move data corresponding to least recently used (LRU) of the data stored in the hot data zone in the second zone group to the warm data zone in the second zone group.

10. The storage system of claim 9, wherein:

when a size of data stored in the warm data zone in the second zone group meets a storage capacity of the warm data zone in the second zone group, the cache tier controller is configured to control the cache tier to move data corresponding to LRU of the data stored in the warm data zone in the second zone group to the cold data zone in the second zone group.

11. The storage system of claim 10, wherein:

when a size of data stored in the cold data zone in the second zone group meets a storage capacity of the cold data zone in the second zone group, the cache tier controller is configured to control the cache tier to delete data corresponding to LRU of the data stored in the cold data zone in the second zone group.

12. The storage system of claim 1, wherein:
the first storage device is accessed at a first speed, and
the cache tier is accessed at a second speed that is faster than the first speed.

13. A storage system comprising:
a storage tier including a plurality of storage devices;
a cache tier including a plurality of zone groups configured to temporarily store data to be stored in the plurality of storage devices and to temporarily store data read from the plurality of storage devices; and
a system controller configured to move data stored in a source storage device among the plurality of storage devices to a target storage device among the plurality of storage devices through the cache tier,
wherein the plurality of zone groups are allocated for the plurality of storage devices, respectively, each of the plurality of zone groups including N (N is a natural number greater than 1) data zones divided according to an average access count of stored data,
wherein the system controller is configured to:
load the data stored in the source storage device in a first data zone among the N data zones in a source zone group allocated to the source storage device,
compare a first average access count of the data stored in the first data zone with a second average access count of data stored in a second data zone among the N data zones in a target zone group allocated to the target storage device,
determine whether the data loaded in the first data zone is moved to the second data zone based on a comparison result of the first average access count and the second average access count,
control the cache tier to move the data loaded in the first data zone to the second data zone when the first average access count is less than or equal to the second average access count, and
control the storage tier to store the data moved to the second data zone in the target storage device,
wherein the second average access count is the lowest among average access counts of the N data zones in the target zone group.

14. The storage system of claim 13, wherein the second data zone is configured to store data of a lowest average access count among the N data zones in the target zone group.

15. The storage system of claim 14, wherein the system controller is configured to:
compare the first average access count with a third average access count of data stored in a third data zone configured to store data of a second lowest average access count when the first average access count is greater than the second average access count,
control the cache tier to move the data loaded in the first data zone to the third data zone when the first average access count is less than or equal to the third average access count, and
control the storage tier to store the data moved to the third data zone in the target storage device.

16. The storage system of claim 13, wherein the system controller is configured to assign a weight corresponding to the target storage device, selected among weights corresponding to each of the plurality of storage devices, to the second average access count.

17. A storage system comprising:
a first storage device;
a second storage device;
a first cache region configured to temporarily store data to be stored in the first storage device and to temporarily store data read from the first storage device;
a second cache region configured to temporarily store data to be stored in the second storage device and to temporarily store data read from the second storage device; and
a system controller configured to control data to be moved between the first storage device and the second storage device through the first cache region and the second cache region,
wherein each of the first cache region and the second cache region includes a hot data zone, a warm data zone, and a cold data zone configured to store data in an order predetermined based on an average access count,
wherein the average access count of the data stored in the first cache region is greater than the average access count of the data stored in the second cache region, and
wherein the system controller is configured to temporarily store the data stored in the first storage device, in the hot data zone of the second cache region, and to store the data temporarily stored in the hot data zone of the second cache region, in the second storage device.

18. The storage system of claim 17, wherein the system controller is configured to:
load the data stored in the first storage device, in the warm data zone of the first cache region, and
temporarily store the data loaded in the warm data zone of the first cache region, in the hot data zone of the second cache region.

19. The storage system of claim 17, wherein the system controller is configured to:
temporarily store the data stored in the second storage device, in the cold data zone of the first cache region, and
store the data temporarily stored in the cold data zone of the first cache region, in the first storage device.

* * * * *